(12) United States Patent
Park

(10) Patent No.: US 12,501,161 B2
(45) Date of Patent: *Dec. 16, 2025

(54) SENSOR DRIVING DEVICE

(71) Applicant: LG INNOTEK CO., LTD., Seoul (KR)

(72) Inventor: Jung Bae Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,761

(22) Filed: Apr. 4, 2024

(65) Prior Publication Data

US 2024/0267625 A1  Aug. 8, 2024

Related U.S. Application Data

(63) Continuation of application No. 17/761,807, filed as application No. PCT/KR2020/012617 on Sep. 18, 2020, now Pat. No. 11,979,664.

(30) Foreign Application Priority Data

Sep. 20, 2019 (KR) .......................... 10-2019-0115839

(51) Int. Cl.
*H04N 23/68* (2023.01)
*H04N 23/54* (2023.01)

(52) U.S. Cl.
CPC ........... *H04N 23/687* (2023.01); *H04N 23/54* (2023.01); *H04N 23/6812* (2023.01)

(58) Field of Classification Search
CPC .. H04N 23/687; H04N 23/54; H04N 23/6812; H04N 23/57; H04N 23/67; G02B 27/646
See application file for complete search history.

(56) References Cited

U.S. PATENT DOCUMENTS

| 11,122,205 | B1 * | 9/2021 | Sharma | H04N 23/54 |
| 11,979,664 | B2 * | 5/2024 | Park | H04N 23/54 |
| 2007/0297055 | A1 | 12/2007 | Enomoto et al. | |
| 2016/0261800 | A1 | 9/2016 | Miyagi | |

(Continued)

FOREIGN PATENT DOCUMENTS

| JP | 2016-122055 A | 7/2016 |
| JP | 2017-15772 A | 1/2017 |

(Continued)

*Primary Examiner* — Lin Ye
*Assistant Examiner* — Tuan H Le
(74) *Attorney, Agent, or Firm* — Birch, Stewart, Kolasch & Birch, LLP

(57) ABSTRACT

A sensor driving device including a fixing part including a first sensor configured to output first inclination information and a plurality of magnets, a moving part which includes a plurality of coils disposed to face the plurality of magnets and a second sensor configured to output second inclination information and which is disposed to be spaced apart from the fixing part, an image sensor coupled to the moving part, and a support connecting the fixing part and the moving part and is made of an elastic material, a controller configured to control electrical signals provided to the plurality of coils using the first inclination information and the second inclination information.

20 Claims, 26 Drawing Sheets

(56) References Cited

U.S. PATENT DOCUMENTS

| | | |
|---|---|---|
| 2016/0327806 A1 | 11/2016 | Kasamatsu |
| 2017/0353662 A1 | 12/2017 | Enta |
| 2018/0173080 A1 | 6/2018 | Enta |
| 2019/0058832 A1 | 2/2019 | Huang et al. |
| 2019/0238728 A1 | 8/2019 | Hwang et al. |
| 2019/0243087 A1* | 8/2019 | Osaka .................. G03B 3/10 |
| 2019/0384034 A1 | 12/2019 | Min et al. |

FOREIGN PATENT DOCUMENTS

| | | | |
|---|---|---|---|
| JP | 2017-78760 A | 4/2017 | |
| JP | 2019-8079 A | 1/2019 | |
| KR | 10-2016-0085300 A | 7/2016 | |

* cited by examiner

[FIG. 1]
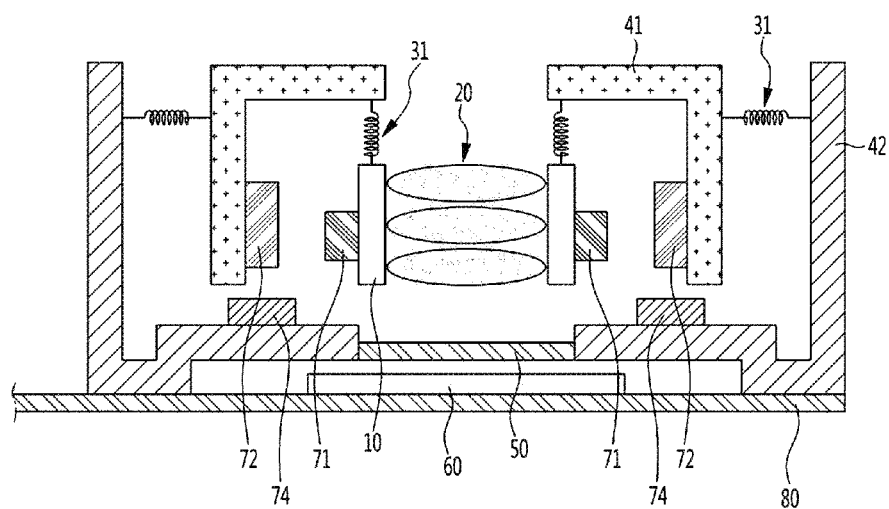
[FIG. 2]
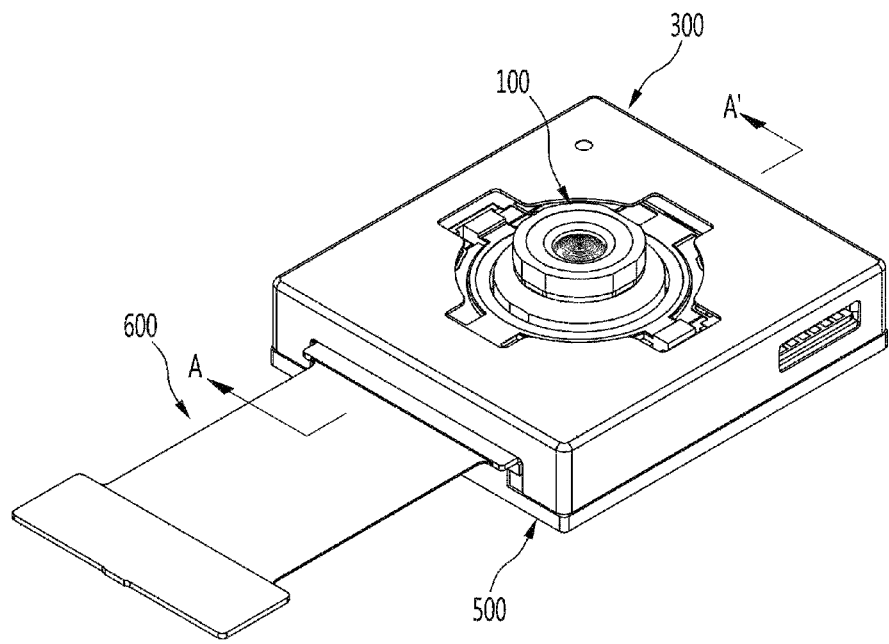

[FIG. 3]
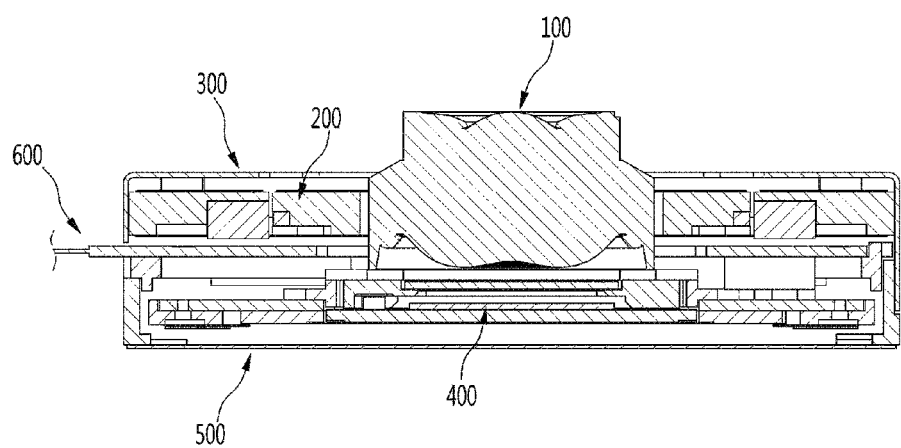

[FIG. 4]
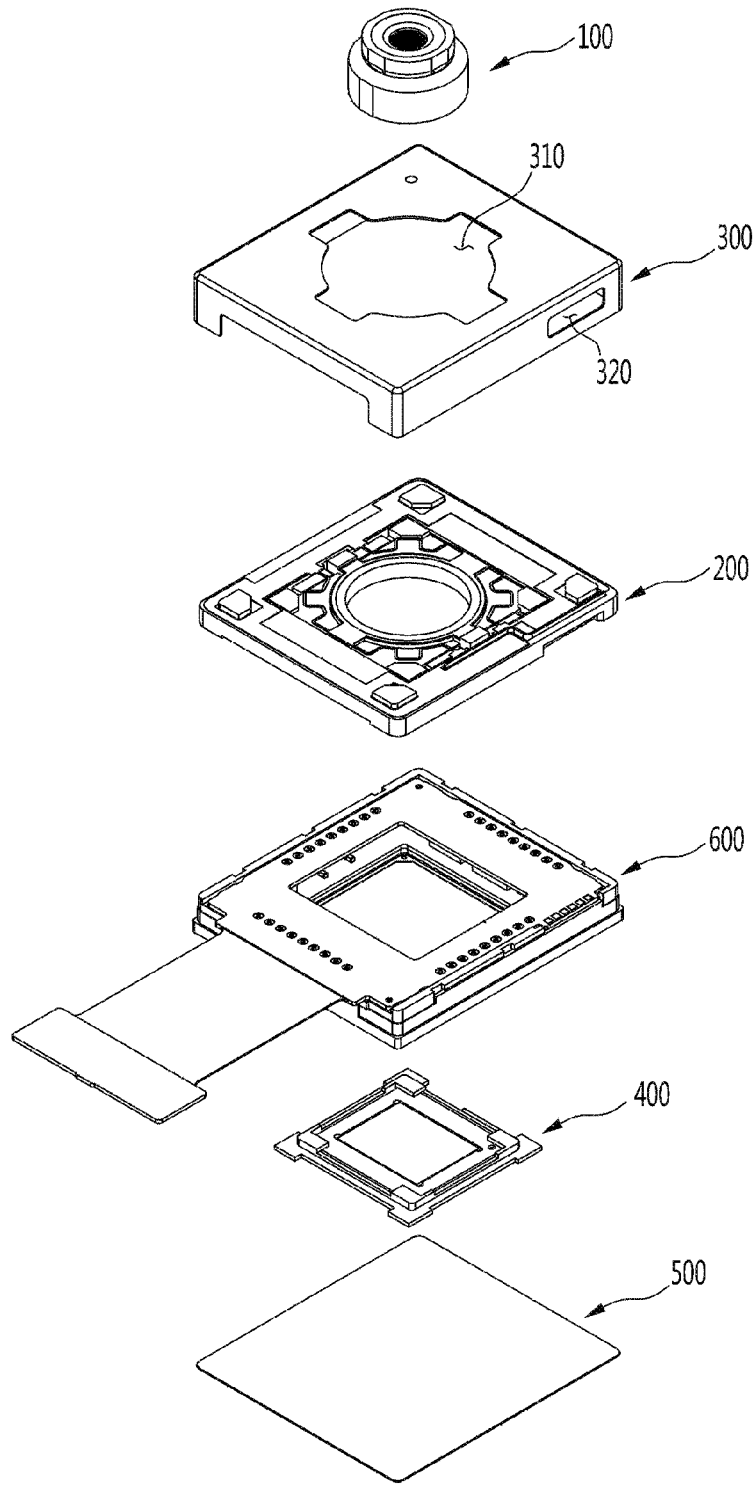

[FIG. 5]
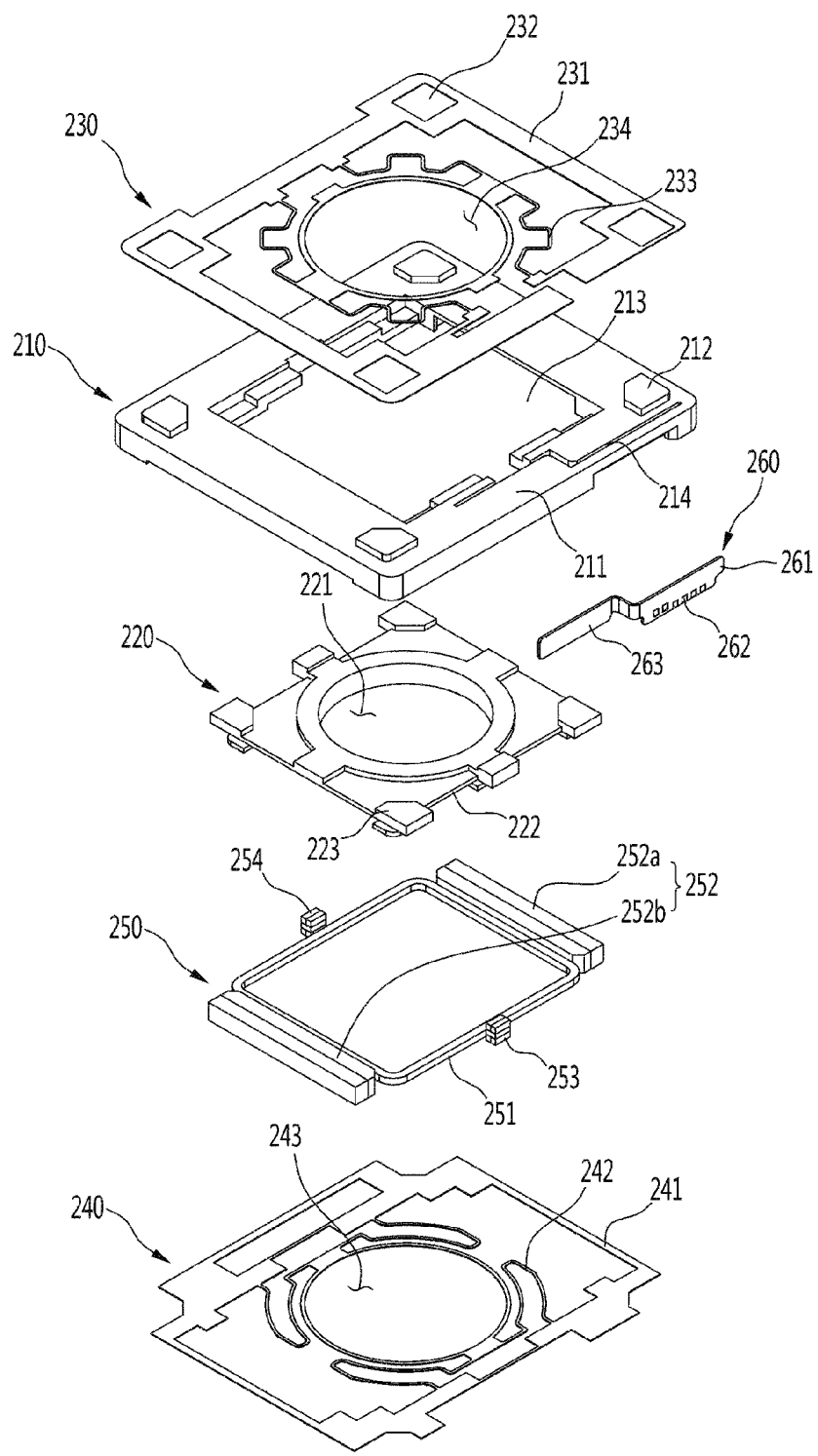

[FIG. 6A]
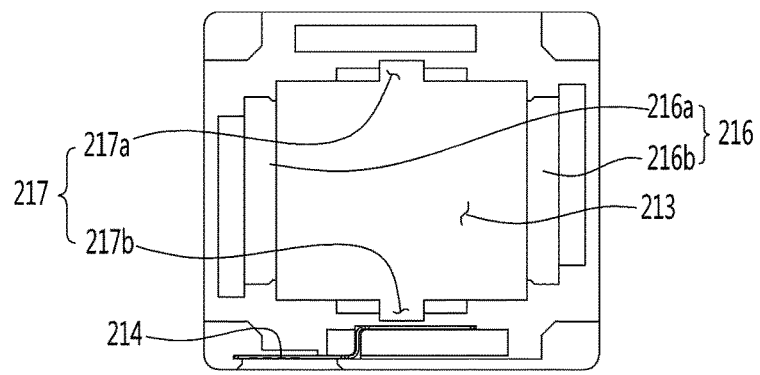
[FIG. 6B]
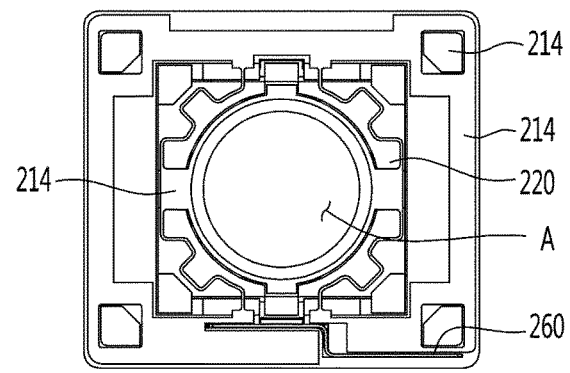
[FIG. 6C]
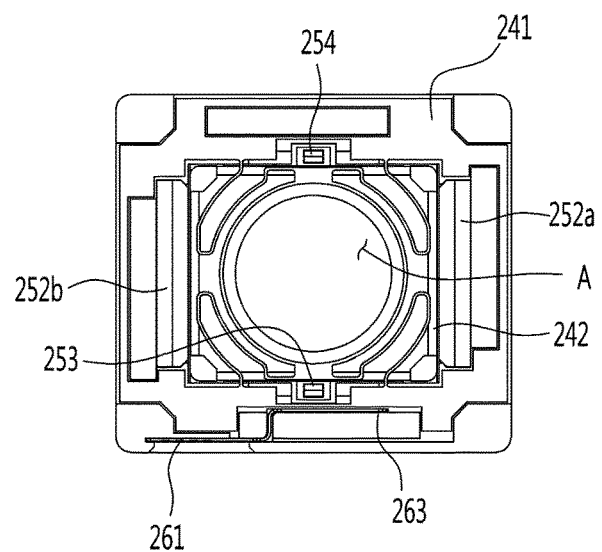

[FIG. 7]
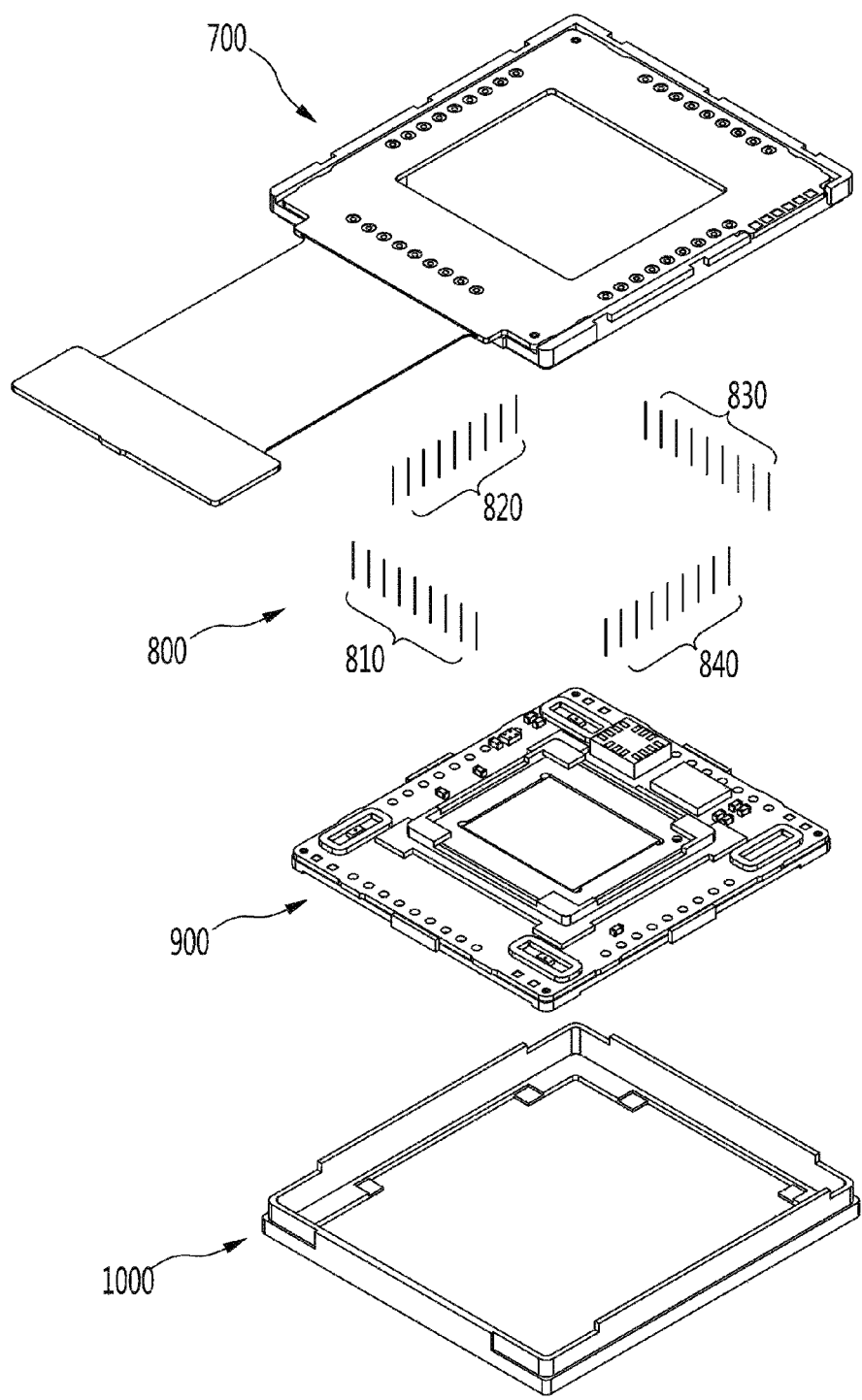

[FIG. 8]
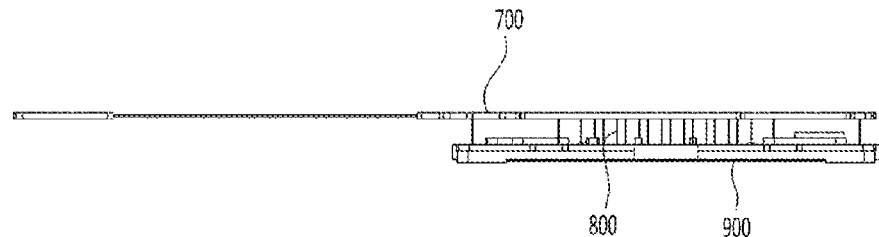
[FIG. 9]
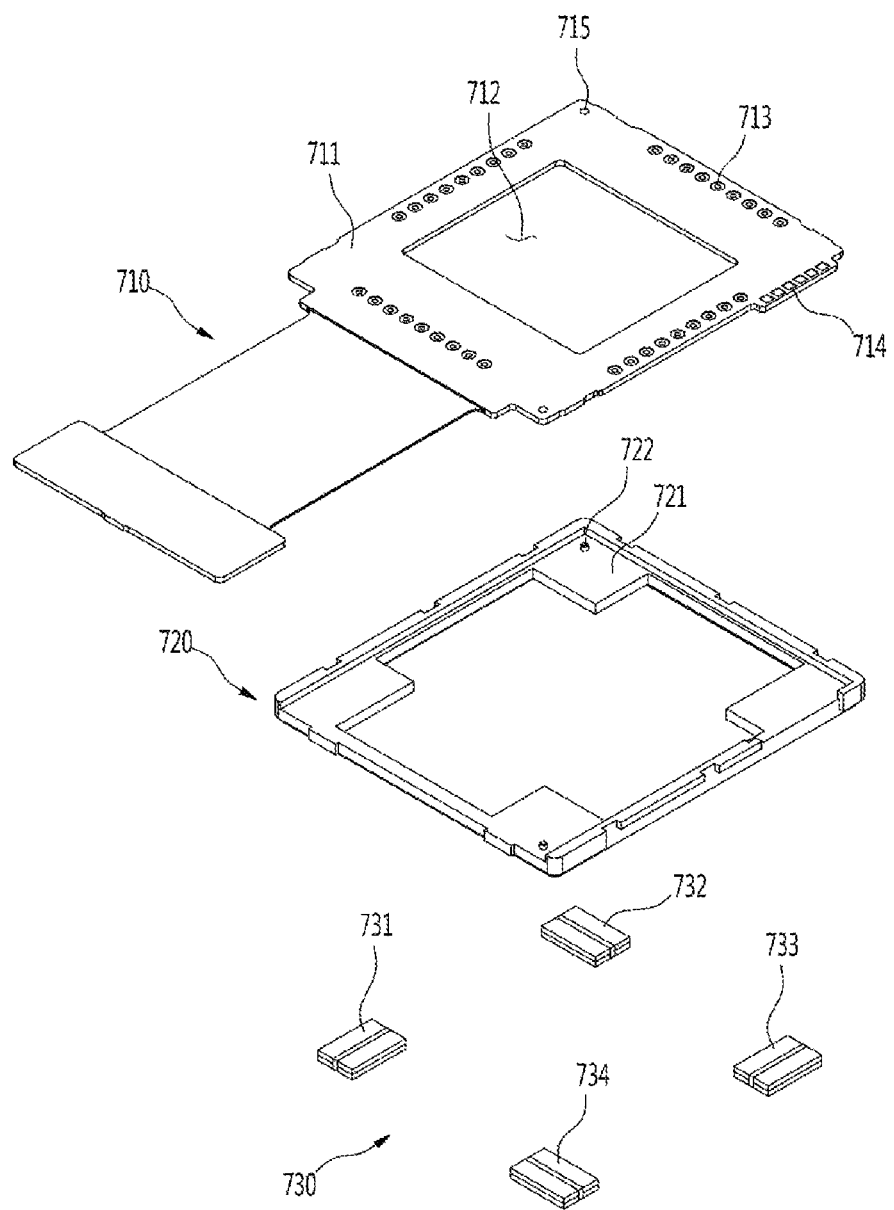

[FIG. 10]
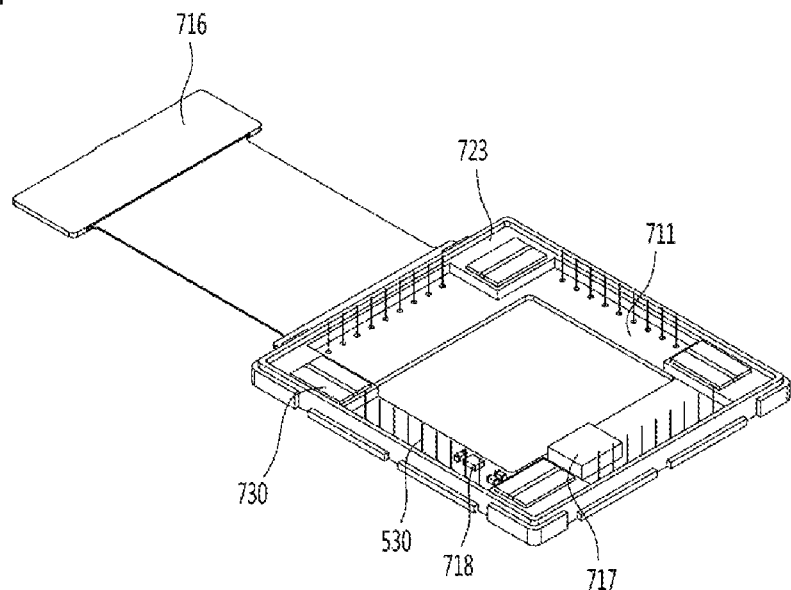
[FIG. 11]
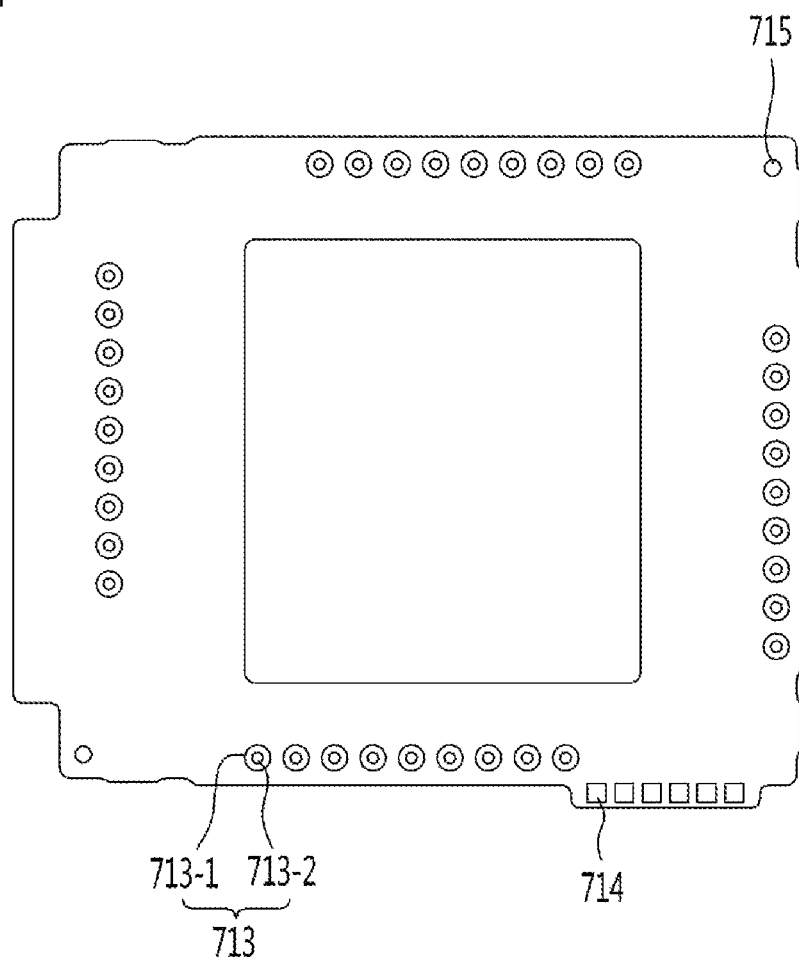

[FIG. 12]
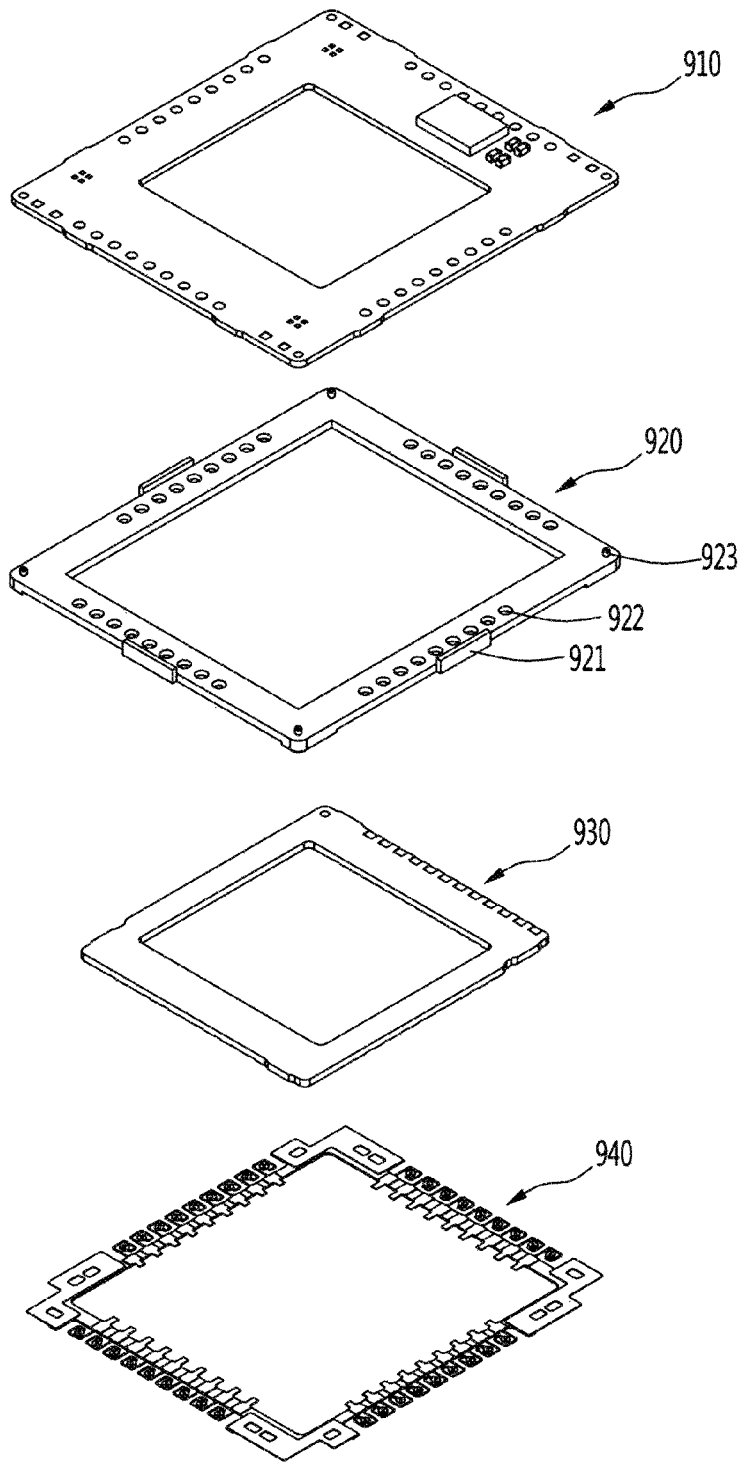

[FIG. 13A]
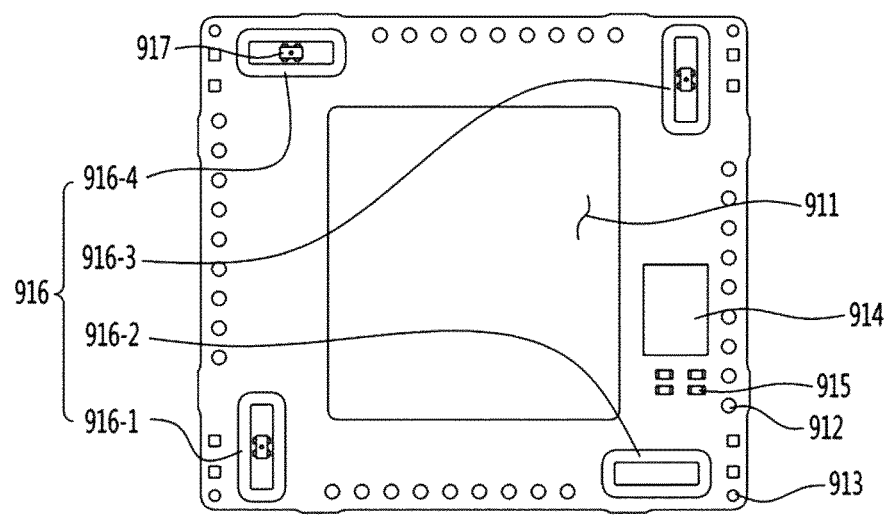
[FIG. 13B]
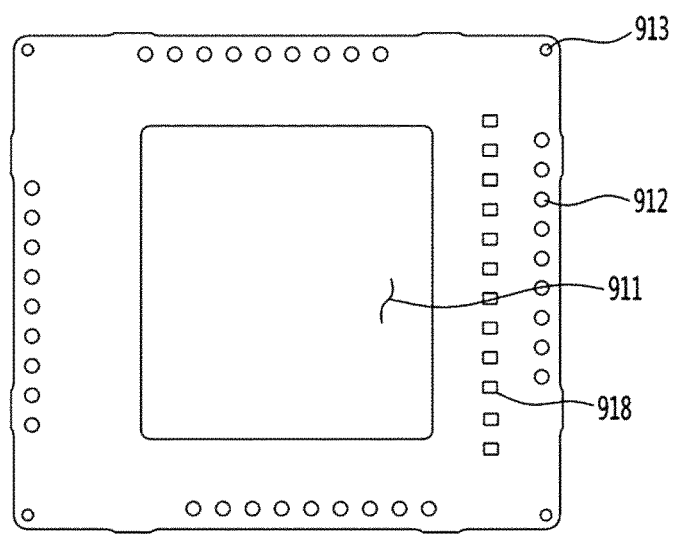

[FIG. 14A]
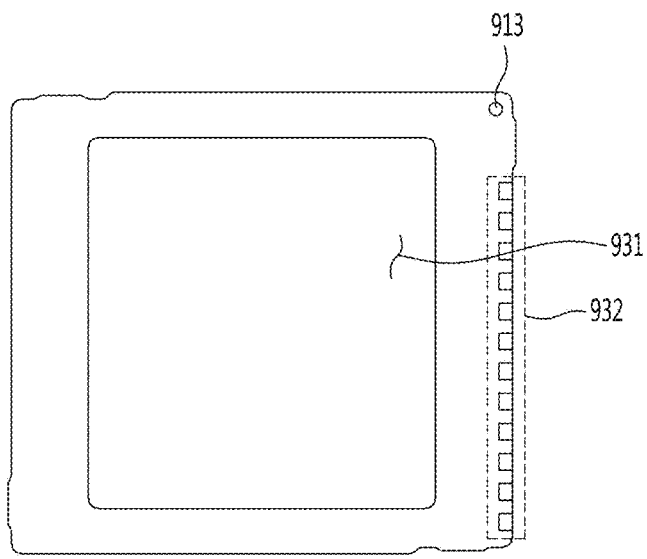
[FIG. 14B]
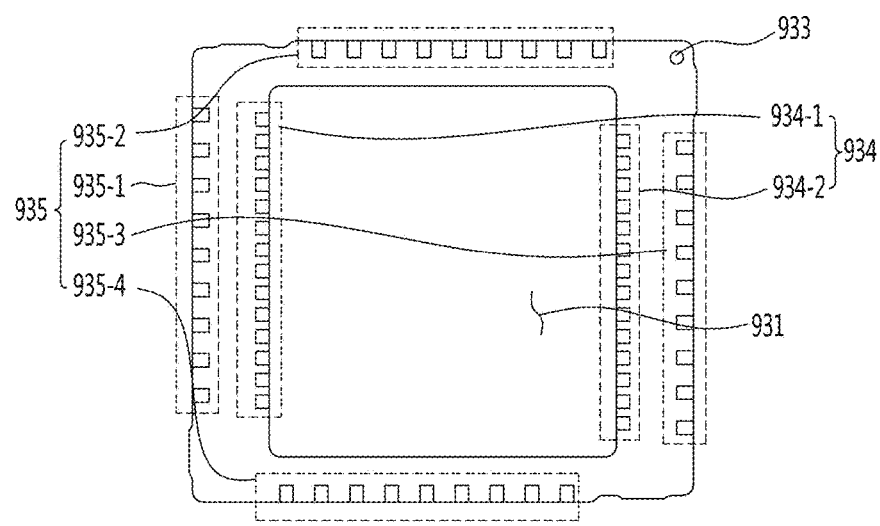

[FIG. 15]
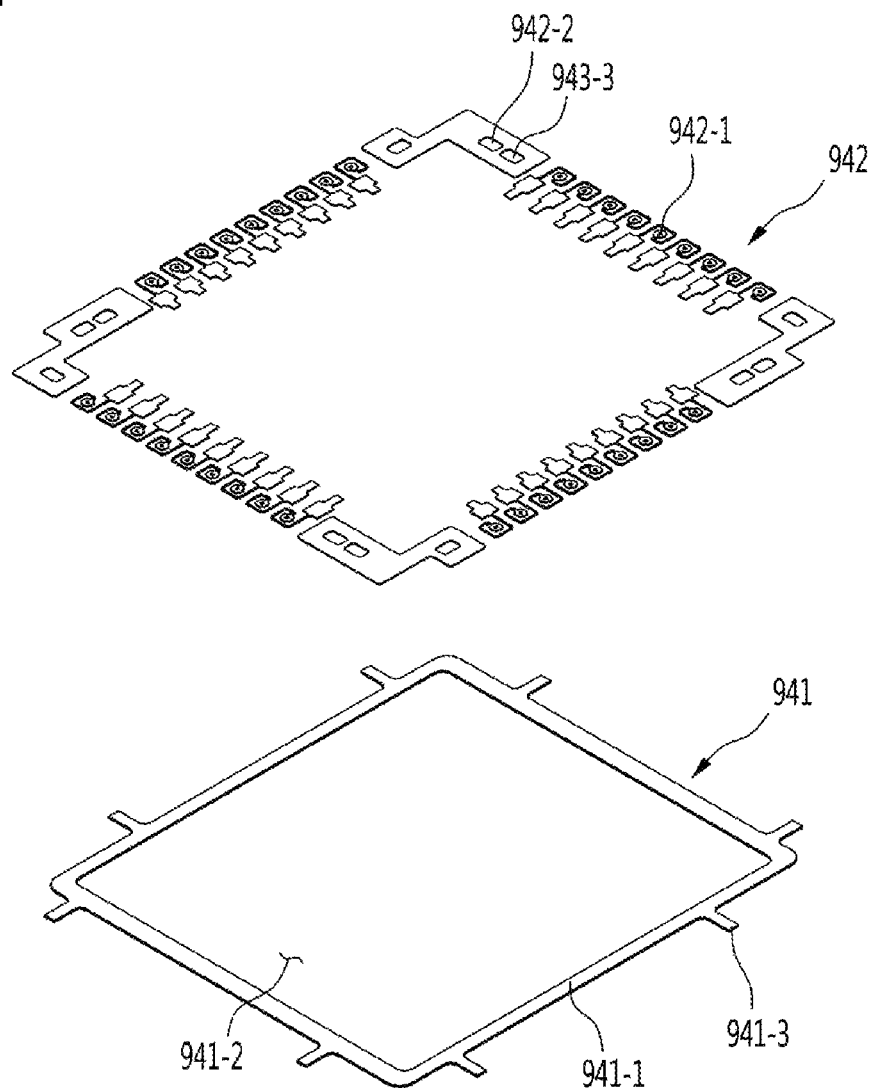

[FIG. 16]
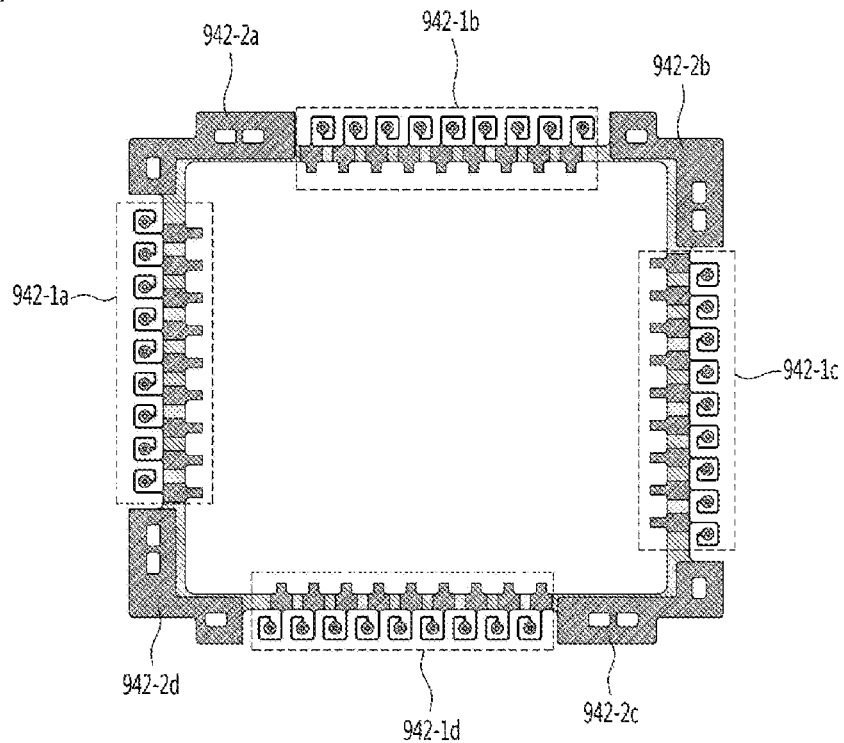
[FIG. 17]
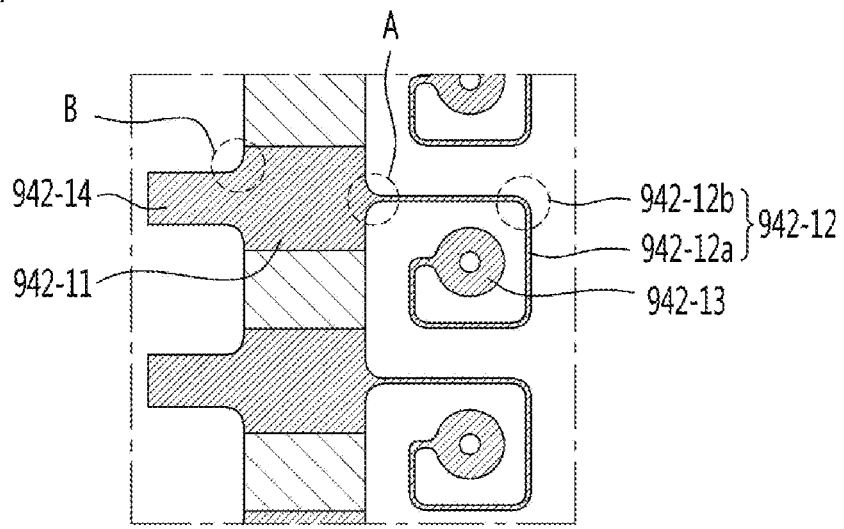

[FIG. 18]
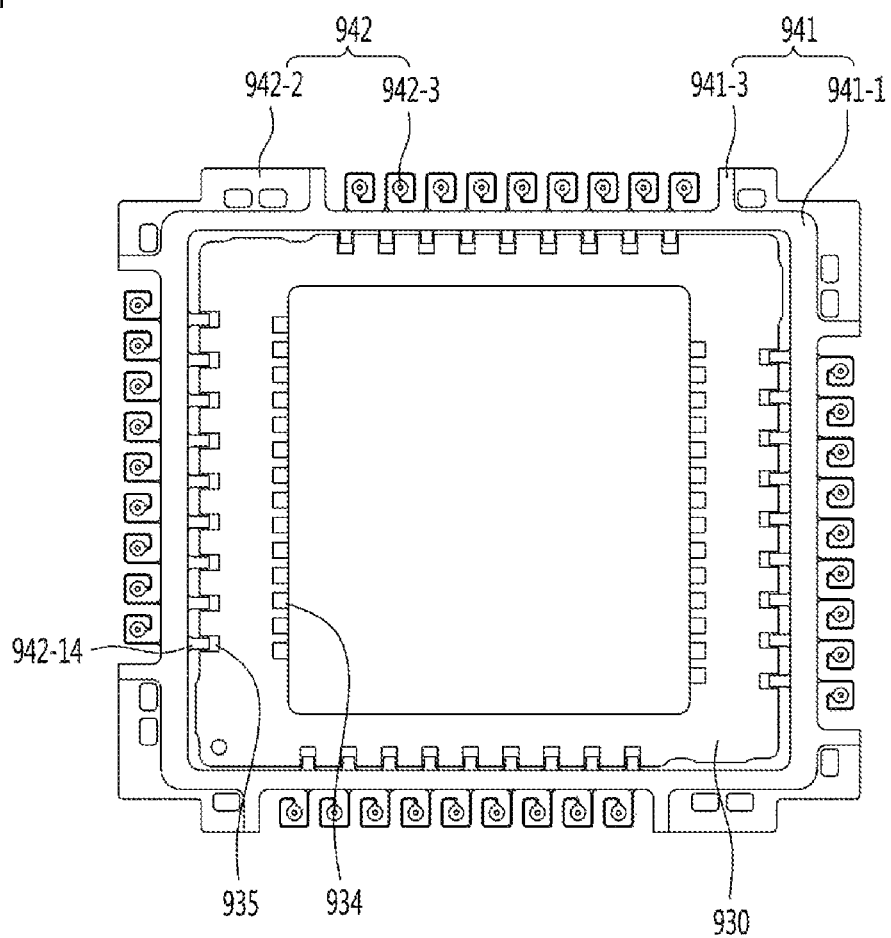

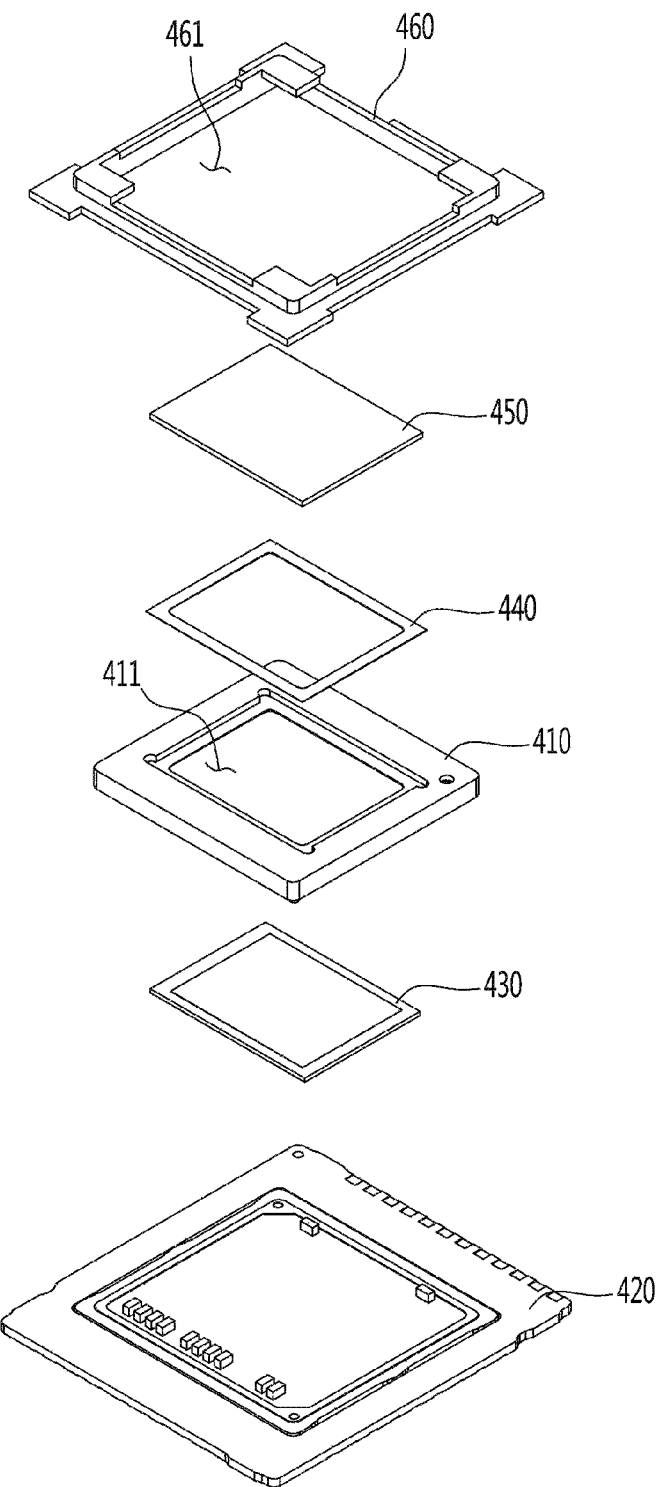
[FIG. 19]

[FIG. 20]
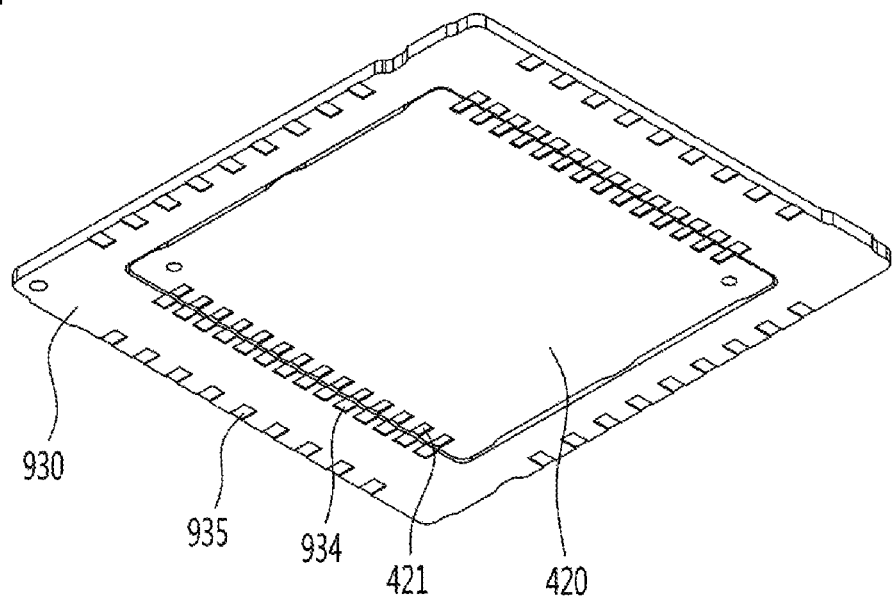

[FIG. 21]
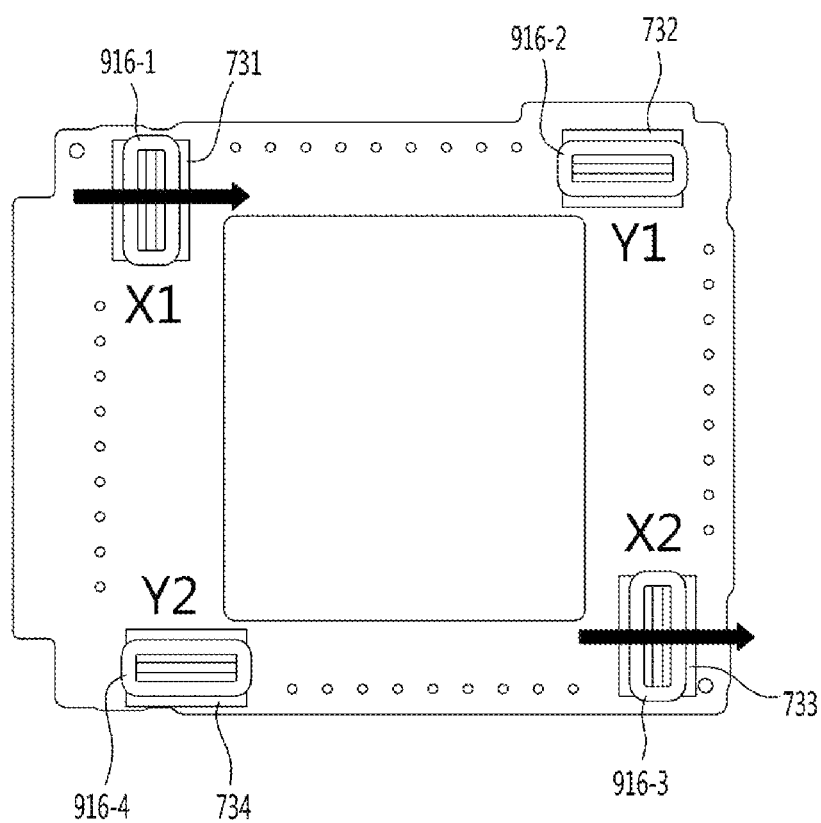

[FIG. 22]
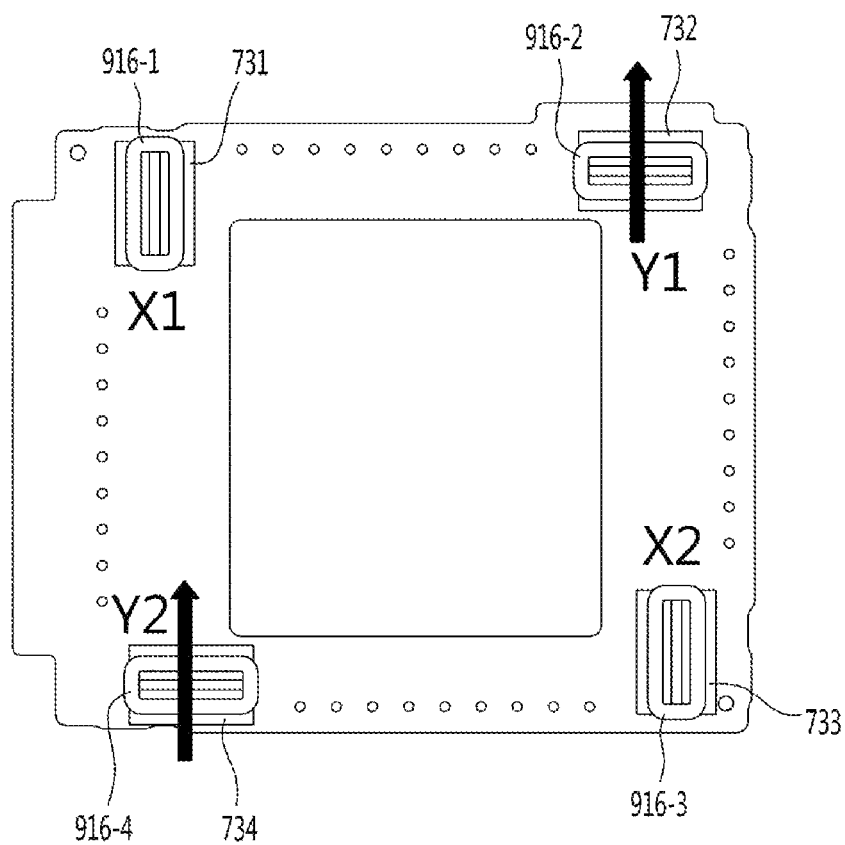

[FIG. 23]
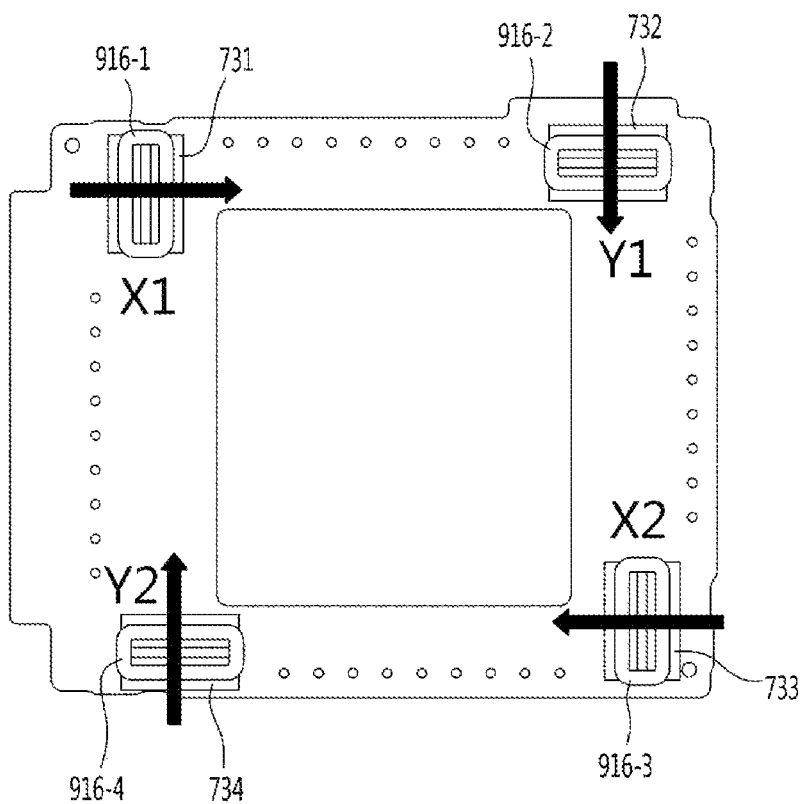

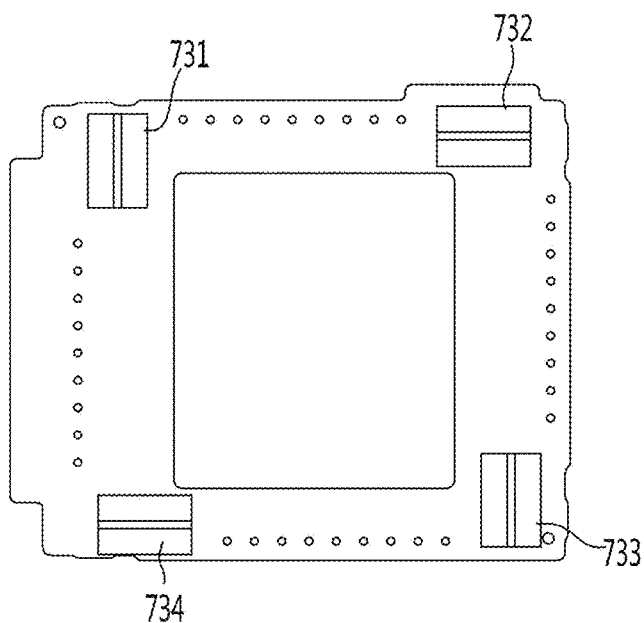
[FIG. 24A]
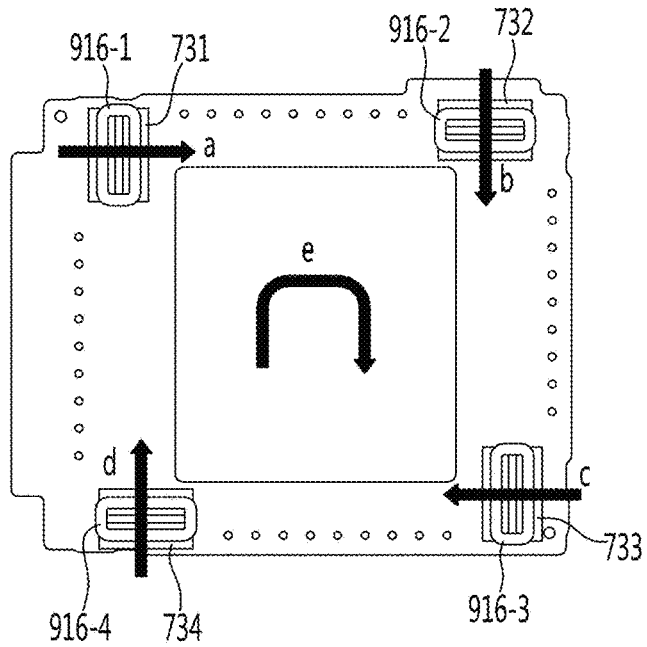
[FIG. 24B]

[FIG. 25]
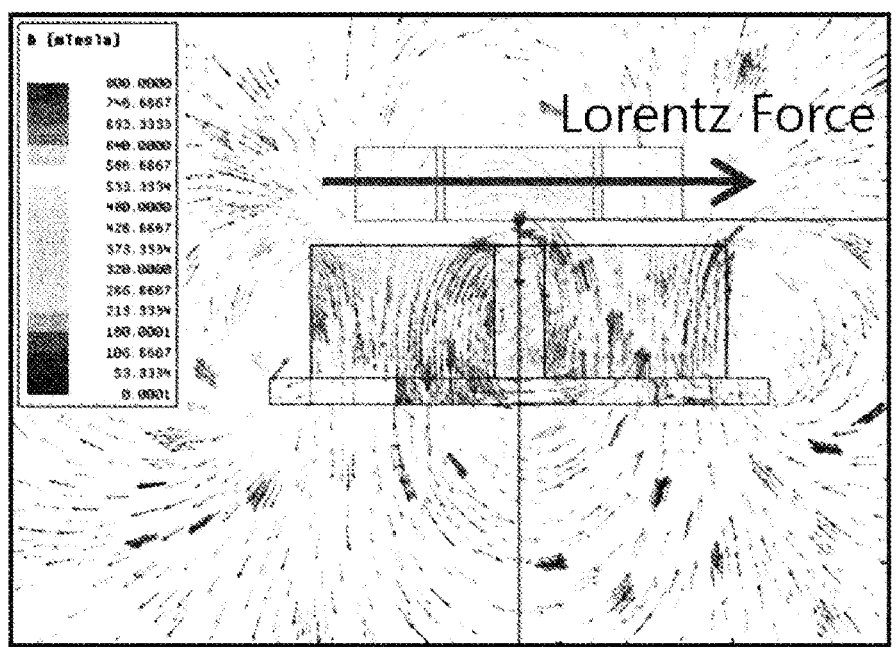

[FIG. 26]
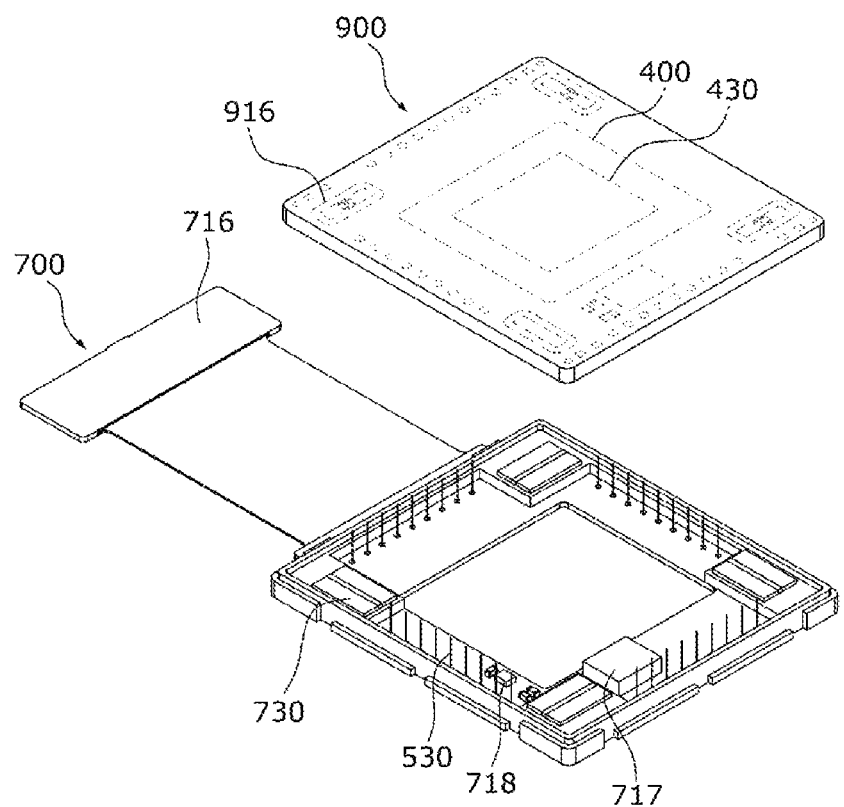
[FIG. 27]
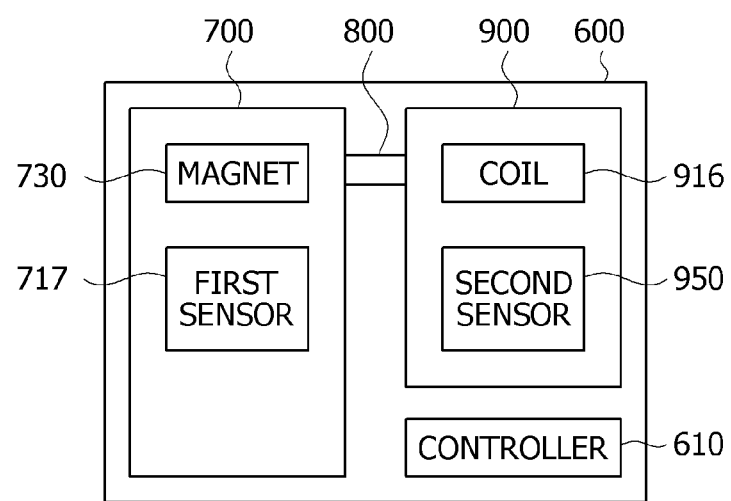

[FIG. 28]
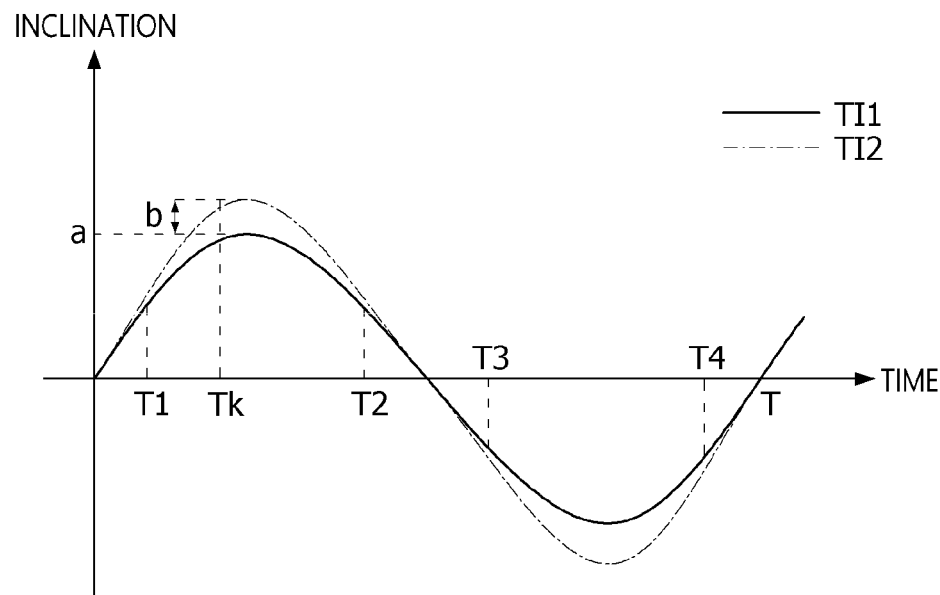
[FIG. 29]
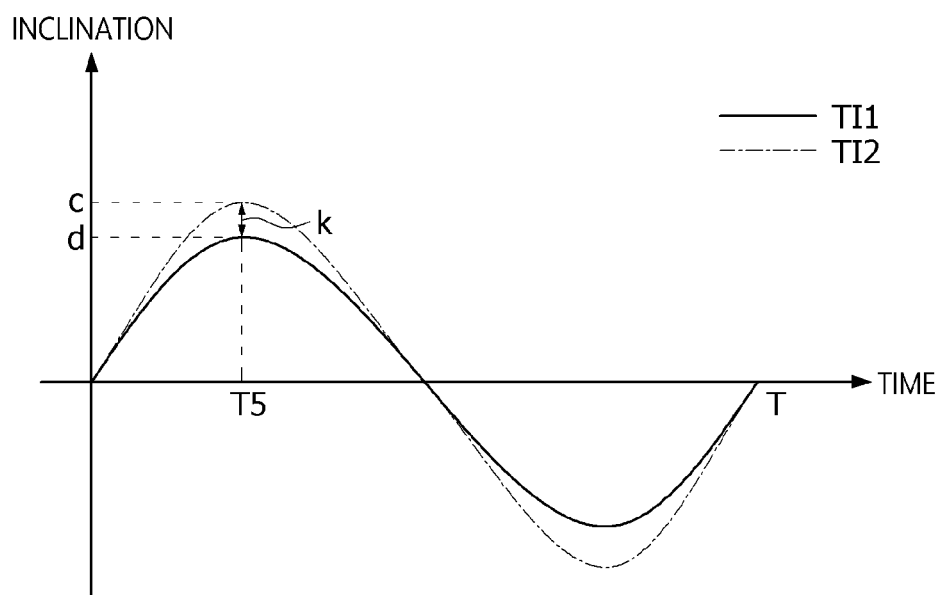

[FIG. 30]
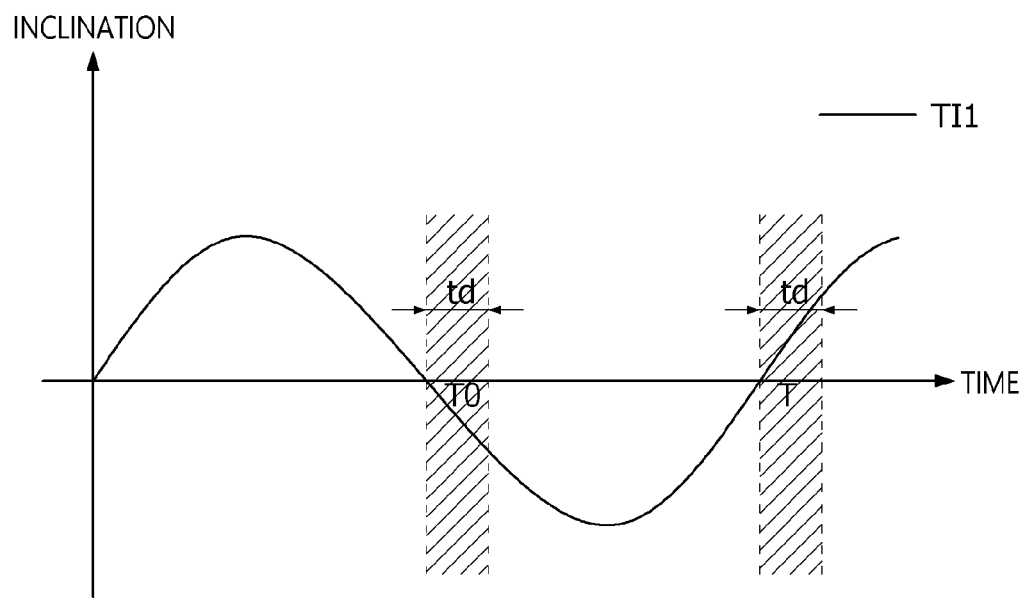
[FIG. 31]
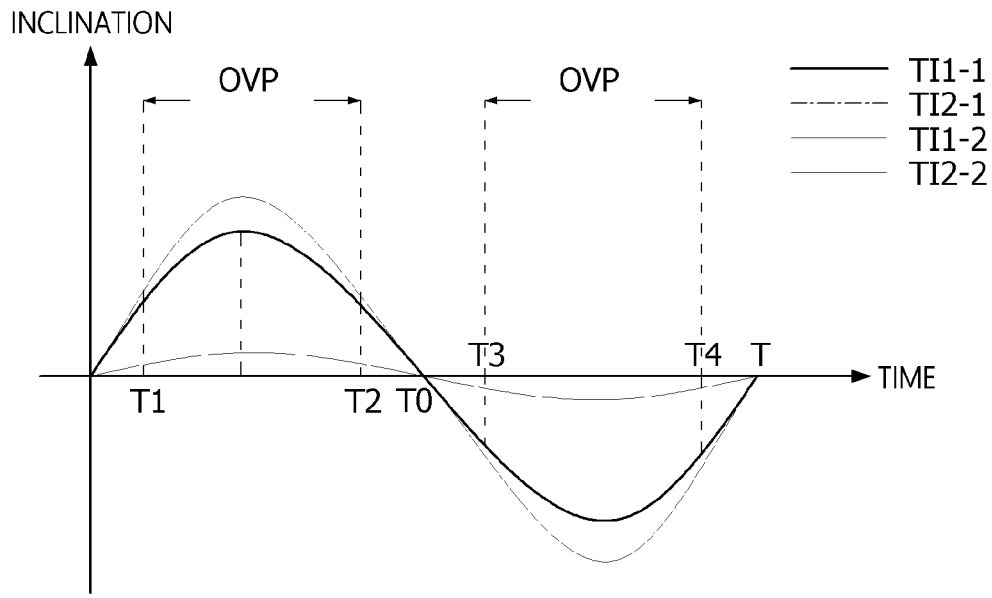

[FIG. 32]
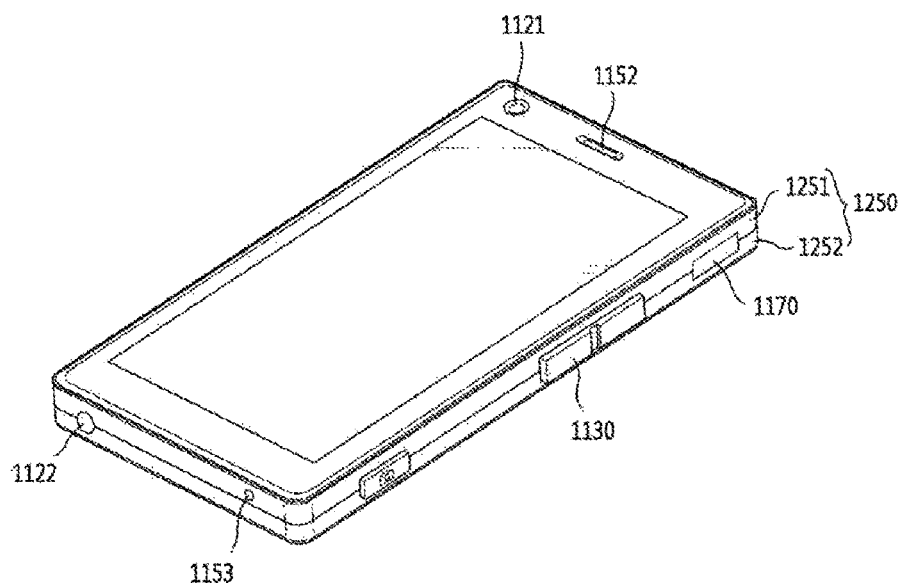

[FIG. 33]
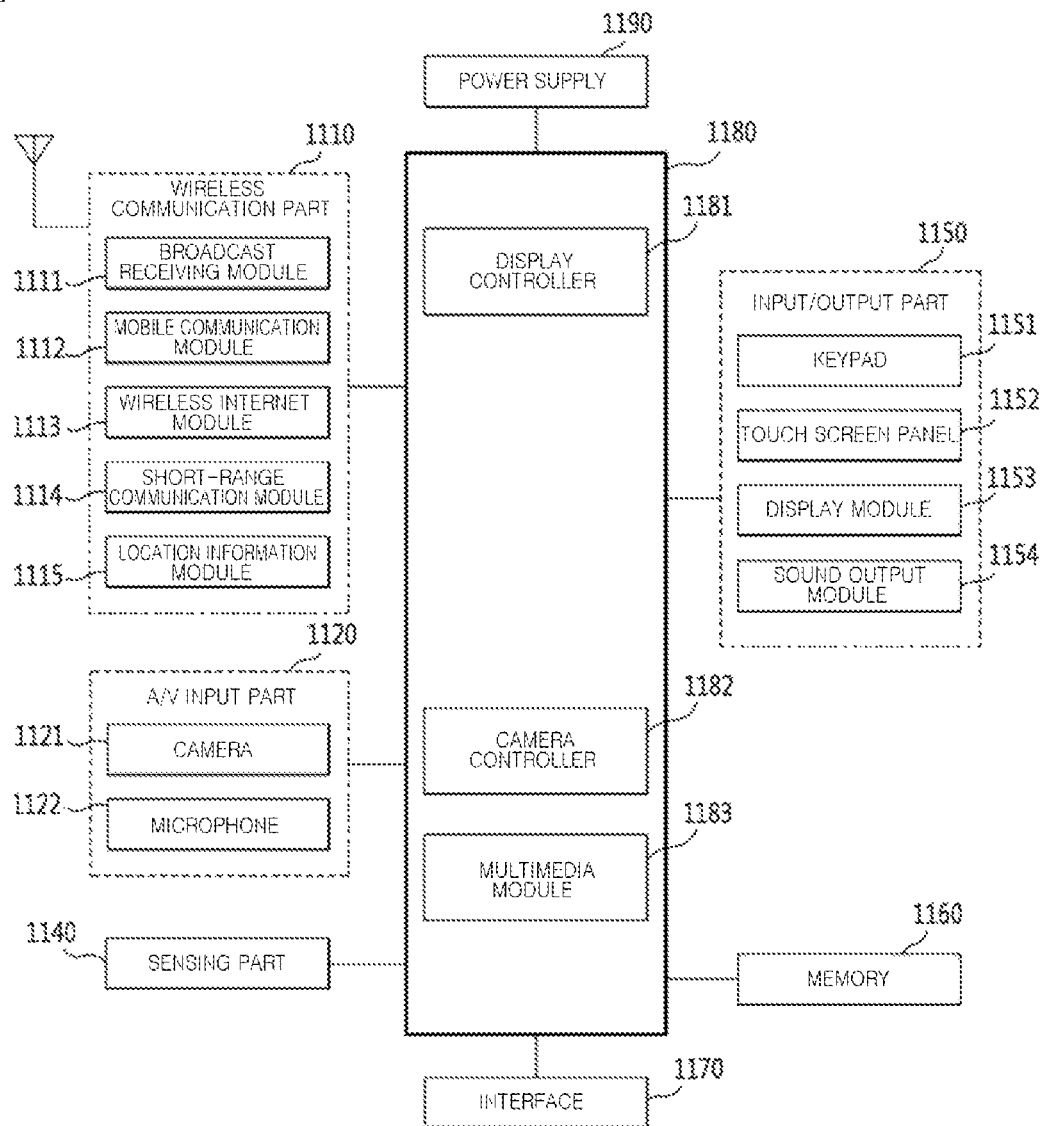

SENSOR DRIVING DEVICE

CROSS REFERENCE TO RELATED APPLICATIONS

This application is a Continuation of application Ser. No. 17/761,807 filed on Mar. 18, 2022 (now U.S. Pat. No. 11,979,664 issued on May 7, 2024), which is the National Phase of PCT International Application No. PCT/KR2020/012617, filed on Sep. 18, 2020, which claims priority under 35 U.S.C. 119 (a) to Patent Application No. 10-2019-0115839, filed in the Republic of Korea on Sep. 20, 2019, all of which are hereby expressly incorporated by reference into the present application.

TECHNICAL FIELD

Embodiments relate to an image sensor driving device and a camera device including the same.

BACKGROUND ART

As the use of various portable terminals is widespread and wireless Internet services are commercialized, the demands of consumers related to portable terminals are diversifying so that various types of add-on devices are being installed in the portable terminals.

As a representative one among the add-on devices, there is a camera device which captures an image or moving images of a subject. Meanwhile, in recent camera devices, a hand shaking correction function is applied to prevent image shaking due to hand shaking of a photographer.

However, lens shifts in x-axis/y-axis directions used in the hand shaking correction module have limitations in correcting various types of shaking.

Technical Problem

The present embodiments are directed to providing a camera device capable of accurately correcting hand shaking.

According to embodiments, since an image sensor is moved with respect to a lens barrel, a camera device having a stable structure is provided.

The technical problems to be solved by the proposed embodiments are not limited to the above-described technical problems and other technical problems which are not described can be clearly understood by those skilled in the art to which the proposed embodiments pertain from the following description.

Problems to be solved in the embodiments are not limited to the above-described problems, and objects and effects which can be determined from the solutions and the embodiments of the problems described below are also included.

SUMMARY OF THE INVENTION

One aspect of the present invention provides a sensor driving device including a fixing part including a first sensor configured to output first inclination information and a plurality of magnets, a moving part which includes a plurality of coils disposed to face the plurality of magnets and a second sensor configured to output second inclination information and which is disposed to be spaced apart from the fixing part, an image sensor coupled to the moving part, a support of which one end is connected to the fixing part and the other end is connected to the moving part and which elastically supports the moving part, and a controller configured to control electrical signals provided to the plurality of coils using the first inclination information and the second inclination information.

The controller may compensate for a difference in magnitude of the first inclination information and the second inclination information in each direction and control the electrical signal.

The controller may control the electrical signal using an average inclination of the first inclination information and the second inclination information.

The controller may control the electrical signal according to the first inclination information and then readjust the electrical signal according to the second inclination information.

The second inclination information may have a time difference with the first inclination information.

When the first inclination information matches the second inclination information, the controller may control the electrical signal according to the first inclination information or the second inclination information.

When the first inclination information is different from the second inclination information, the controller may control the electrical signal according to the second inclination information.

The plurality of coils may be moved based on the plurality of magnets due to the electric signal.

The image sensor may be disposed inside the moving part and be moved according to movement of the moving part.

Each of the first inclination information and the second inclination information may include an angular velocity or a linear velocity.

Advantageous Effects

In accordance with the embodiments, a stable structure can be formed due to an image sensor according to the embodiments is moved with respect to a lens barrel.

In addition, in accordance with the embodiments, hand shaking correction by which accuracy and a processing speed are improved can be performed while the image sensor is stably elastically supported.

Various beneficial advantages and effects of the present invention are not limited by the detailed description and should be easily understood through a description of a detailed embodiment of the present invention.

BRIEF DESCRIPTION OF THE DRAWINGS

FIG. 1 is a diagram illustrating a camera module according to a comparative example.

FIG. 2 is a perspective view illustrating a camera device according to the present embodiment.

FIG. 3 is a cross-sectional view taken along line A-A of FIG. 2.

FIG. 4 is an exploded perspective view illustrating the camera device according to the present embodiment.

FIG. 5 is an exploded perspective view illustrating a first actuator shown in FIG. 4.

FIG. 6A is a plan view illustrating a base of FIG. 5.

FIG. 6B is a plan view illustrating the first actuator of FIG. 5.

FIG. 6C is a bottom view illustrating the first actuator of FIG. 5.

FIG. 7 is an exploded perspective view illustrating a second actuator according to an embodiment.

FIG. 8 is a schematic cross-sectional view illustrating a connection relationship between a first board and a moving part of FIG. 7.

FIG. 9 is an exploded perspective view illustrating a fixing part of FIG. 7.

FIG. 10 is a bottom view illustrating the fixing part of FIG. 7.

FIG. 11 is a diagram illustrating an upper surface of the first board in more detail.

FIG. 12 is an exploded perspective view illustrating the moving part according to an embodiment.

FIG. 13A is a plan view illustrating a second board.

FIG. 13B is a bottom view illustrating the second board.

FIG. 14A is a plan view illustrating a third board.

FIG. 14B is a bottom view illustrating the third board.

FIG. 15 is an exploded perspective view illustrating a fourth board.

FIG. 16 is a plan view illustrating the fourth board.

FIG. 17 is an enlarged view illustrating a specific region of FIG. 16.

FIG. 18 is a diagram illustrating the coupling of the third board and the fourth board.

FIG. 19 is an exploded perspective view illustrating an image sensor module according to an embodiment.

FIG. 20 is a diagram illustrating the coupling of the third board and an image sensor module.

FIG. 21 is a diagram for describing shift driving in an x-axis direction through some components of the camera device according to the present embodiment.

FIG. 22 is a diagram for describing shift driving in a y-axis direction through some components of the camera device according to the present embodiment.

FIG. 23 is a diagram for describing rotation driving about a z-axis through some configurations of the camera device according to the present embodiment.

FIG. 24A is a diagram illustrating the first board and a magnet disposed in a magnet holder together with an x-axis and a y-axis.

FIG. 24B is a diagram illustrating the first board, the magnet holder, the magnet, and a coil together with rotation driving in the z-axis.

FIG. 25 is a diagram illustrating a magnetic flow and a Lorentz force between the magnet and the coil of the camera device according to the present embodiment.

FIG. 26 is a conceptual diagram of a second actuator according to an embodiment.

FIG. 27 is a block diagram illustrating the second actuator according to an embodiment.

FIG. 28 is a diagram for describing the driving of a second actuator according to one example.

FIG. 29 is a diagram for describing the driving of a second actuator according to another example.

FIG. 30 is a diagram for describing the driving of a second actuator according to still another example.

FIG. 31 is a diagram for describing the driving of a second actuator according to a modified example.

FIG. 32 is a perspective view illustrating an optical instrument according to the present embodiment.

FIG. 33 is a block diagram illustrating the optical instrument shown in FIG. 32.

DETAILED DESCRIPTION OF THE EMBODIMENTS

Hereinafter, exemplary embodiments of the present invention will be described in detail with reference to the accompanying drawings.

However, the technical idea of the present invention is not limited to some embodiments to be described but may be implemented in various different forms, and, within the scope of the technical idea of the present invention, one or more among components in the embodiments may be used by being selectively combined and substituted.

Further, unless specifically defined and described, terms used in the embodiments of the present invention (including technical and scientific terms) may be construed as meanings which are generally understood by those skilled in the art to which the present invention pertains, and generally used terms such as terms defined in the dictionary may be interpreted in consideration of the contextual meaning of the related art.

In addition, terms used in the embodiments of the present invention are intended to describe the embodiments and are not intended to limit the present invention.

In the present disclosure, the singular forms may include the plural forms unless the context clearly dictates otherwise, and, when described as "at least one (or one or more) among A, B, and (or) C," it may include one or more of all possible combinations of A, B, and C.

In addition, in describing components of embodiments of the present invention, the terms first, second, A, B, (a), (b), and the like can be used.

These terms are intended to distinguish one component from other components, but the nature and the order or sequence of the components is not limited by those terms.

In addition, when a component is described as being "linked," "coupled," or "connected" to another component, the component is not only directly linked, coupled, or connected to another component, but also "linked," "coupled," or "connected" to another component with still another component disposed between the component and another component.

Further, when a component is described as being formed or disposed "on (above) or under (below)" of another component, the term "on (above) or under (below)" includes not only when two components are in direct contact with each other, but also when one or more of other components are formed or disposed between the two components. Further, when a component is described as being "on (above) or below (under)," the description may include the meanings of an upward direction and a downward direction based on one component.

Hereinafter, exemplary embodiments of the present invention will be described in detail with reference to the accompanying drawings.

FIG. 1 is a diagram illustrating a camera module according to a comparative example. A camera module with an optical image stabilization (OIS) function and an auto focusing (AF) function requires at least two spring plates.

The camera module according to the comparative example may include two spring plates. The camera module according to the comparative example requires elastic members, e.g., at least six springs, in the spring plate.

Referring to FIG. 1, the camera module according to the comparative example includes an optical system including a lens assembly, an infrared cut filter, and a sensor. That is, the camera module according to the comparative example includes a lens barrel 10, a lens assembly 20, a first elastic member 31, a second elastic member 32, a first housing 41, a second housing 42, an infrared cut filter 50, a sensor 60, a circuit board 80, and drivers 71, 72, 73, and 74.

In this case, the lens barrel 10 is connected to the first housing 41. That is, the lens barrel 10 is connected to the first housing 41 through the first elastic member 31. That is, the lens barrel 10 is connected to the first housing 41 to be movable by the first elastic member 31. In this case, the first elastic member 31 includes a plurality of springs (not shown). For example, the first elastic member 31 connects the lens barrel 10 and the first housing 41 at each of a plurality of points on the lens barrel 10.

The second elastic member 32 is connected to the first housing 41 and the second housing 42 which accommodates the first housing 41. The second elastic member 32 movably fixes the first housing 41 to the second housing 42. The second elastic member 32 includes a plurality of springs. Specifically, the second elastic member 32 includes a plate-shaped spring.

In this case, the first elastic member 31 supports the lens barrel 10 and moves the lens barrel 10 relative to the sensor 60 in a vertical direction (z-axis direction). To this end, the first elastic member 31 includes four or more springs.

In this case, the second elastic member 32 supports the lens barrel 10 and moves the lens barrel 10 relative to the sensor 60 in a horizontal direction (x-axis direction and y-axis direction). To this end, the second elastic member 32 includes two or more springs.

As described above, the lens barrel 10 is moved in the x-axis, y-axis, and z-axis directions, and thus the camera module according to the comparative example performs the OIS function and the AF function. To this end, the camera module according to the comparative example requires elastic members, e.g., at least six springs. In addition, the camera module according to the comparative example requires two spring plates for supporting the above-described elastic members. In addition, the camera module according to the comparative example requires an additional member such as an elastic wire for fixing a z-axis of the lens barrel 10. Therefore, in the camera module according to the comparative example, a spring structure for moving the lens barrel in the x-axis, y-axis, and z-axis is complicated.

In addition, in order to couple the elastic members to the lens barrel 10, a process of manually bonding each elastic member should be performed on the camera module according to the comparative example. Accordingly, in the camera module according to the comparative example, a manufacturing process is complicated and a great deal of manufacturing time is required.

In addition, although the camera module according to the comparative example provides a tilt function of the lens barrel 10, the camera module has a structure which is difficult to actually correct a tilt of an image. That is, even when the lens barrel 10 rotates relative to the sensor 60, since an image incident on the sensor 60 is not changed, it is difficult to correct the tilt of the image, and furthermore, a tilt function itself is not necessary.

Hereinafter, a board for an image sensor, a camera module, and a camera device including the board and the camera module according to an embodiment will be described.

An "optical axis direction" used below is defined as an optical axis direction of a lens and/or an image sensor coupled to a lens driving device.

A "vertical direction" used below may be a direction parallel to the optical axis direction. The vertical direction may correspond to a "z-axis direction." A "horizontal direction" used below may be a direction perpendicular to the vertical direction. That is, the horizontal direction may be a direction perpendicular to the optical axis. Accordingly, the horizontal direction may include an "x-axis direction" and a "y-axis direction."

An "auto focus function" used below is defined as a function which moves the lens in the optical axis direction according to a distance from a subject so as to allow the image sensor to acquire a clear image of the subject and adjusts a distance from the image sensor, thereby automatically adjusting a focus on the subject. Meanwhile, the "auto focus function" may correspond to the "AF function."

The "hand shaking correction function" used below is defined as a function of moving the lens and/or the image sensor so as to offset a vibration (movement) generated in the image sensor due to an external force. Meanwhile, the "hand shaking correction" may correspond to "OIS."

FIG. 2 is a perspective view illustrating a camera device according to the present embodiment, FIG. 3 is a cross-sectional view taken along line A-A of FIG. 2, and FIG. 4 is an exploded perspective view illustrating the camera device according to the present embodiment.

The camera device of the embodiment may include a camera module. The camera device may include a lens driving device. Here, the lens driving device may be a voice coil motor (VCM). The lens driving device may be a lens driving motor. The lens driving device may be a lens driving actuator. The lens driving device may include an AF module. The lens driving device may include an OIS module.

The camera device may include a lens module 100.

The lens module 100 may include a lens and a lens barrel. The lens module 100 may include one or more lenses and a lens barrel capable of accommodating the one or more lenses. However, one component of the lens module 100 is not limited to the lens barrel, and any holder structure capable of supporting one or more lenses may be used. The lens module 100 may be coupled to a first actuator 200 and moved. For example, the lens module 100 may be coupled to an inner side of the first actuator 200. Accordingly, in the inner side of the first actuator 200, the lens module 100 may be moved to correspond to the movement of the first actuator 200. The lens module 100 may be screw-coupled to the first actuator 200. For example, the lens module 100 may be coupled to the first actuator 200 using an adhesive (not shown). Meanwhile, light passing through the lens module 100 may be incident on the image sensor. Meanwhile, the lens module 100 may include, for example, five lenses. The lens module 100 may include a liquid lens and a solid lens. The liquid lens includes a conductive liquid and a non-conductive liquid, and an interface formed between the conductive liquid and the non-conductive liquid may be controlled by an electrical force. The liquid lens may be a lens of which a focal length is adjusted by adjusting the interface.

The camera device may include an actuator.

Specifically, the camera device may include the first actuator 200 for shifting the lens module 100. The first actuator 200 may be an AF module. The first actuator 200 may move the lens module 100 in the vertical direction (definitely, the optical axis direction). That is, the first actuator 200 moves the lens module 100 in the optical axis direction and allow the lens module 100 to perform an AF function.

A second actuator 600 may drive an image sensor 430. The second actuator 600 may tilt or rotate the image sensor 430. The second actuator 600 may move the image sensor 430. The second actuator 600 may move the image sensor 430 in a first direction perpendicular to the optical axis, move the image sensor 430 in a second direction perpendicular to the optical axis and the first direction, and rotate the image sensor 430 about the optical axis. In this case, the first direction may be the x-axis direction, the second direction may be the y-axis direction, and the optical axis may be the z-axis direction.

Meanwhile, in order to move each of the lens module 100 and the image sensor 430, the first actuator 200 and the second actuator 600 may each include a driver. That is, the first actuator 200 may include a first driver (which will be described below). In addition, the second actuator 600 may include a second driver (which will be described below). Each of the first driver and the second driver may include a coil and a magnet. In addition, the coil and the magnet may generate a mutual electromagnetic force to drive the lens module 100 and the image sensor 430.

The camera device may include cases 300 and 500.

The cases 300 and 500 may include a first case 300 and a second case 500. The first case 300 may be an upper case which covers an upper portion of the camera device. In this case, the first case 300 may be a shield can.

The first case 300 may be disposed to surround side portions of the first actuator 200, the second actuator 600, and an image sensor module 400 which constitute the camera device. A first opening portion 310 may be formed in an upper surface of the first case 300.

The first opening portion 310 of the first case 300 may be a hollow hole. The lens module 100 coupled to the first actuator 200 may be disposed in the first opening portion 310 of the first case 300. In this case, the first opening portion 310 of the first case 300 may have a diameter that is greater than a diameter of the lens module 100.

Specifically, the first case 300 may include an upper plate and a plurality of side plates which are curved or bent from edges of the upper plate to extend downward. For example, the upper plate of the first case 300 may have a quadrangular shape, and thus the first case 300 may include four side plates extending downward from four edges of the upper plate. For example, the first case 300 may have a rectangular parallelepiped shape in which the first opening portion 310 into which the lens module 100 is inserted is formed in the upper surface, a lower surface is open, and corners are rounded.

Meanwhile, a second opening portion 320 may be formed in any one among the four side plates of the first case 300. The second opening portion 320 may be an exposure hole for exposing some components of the first actuator 200, which is disposed in the first case 300, to the outside. For example, the second opening portion 320 of the first case 300 may expose a terminal 262 of a flexible circuit board 260 of the first actuator 200. The second opening portion 320 may be an opening for soldering which is performed for coupling a terminal of the flexible circuit board 260 to a first board of a second actuator, which will be described below.

The second case 500 may be a lower case which covers a lower portion of the camera device. The second case 500 may close the open lower portion of the first case 300.

The first actuator 200, the second actuator 600, and the image sensor module 400, which constitute the camera device, may be disposed in an accommodation space formed by the first case 300 and the second case 500.

The image sensor module 400 may be coupled to the second actuator 600. The second actuator 600 may include a fixing part (which will be described below) and a moving part (which will be described below). In addition, the moving part of the second actuator 600 may be connected to the fixing part through a wire (which will be described below). The moving part of the second actuator 600 may be moved relative to the fixing part due to an electromagnetic force of the second driver. Here, the movement of the fixing part may include movement of the fixing part in the first direction, movement in the second direction, and movement in the optical axis direction.

In addition, the image sensor module 400 may be coupled to the moving part of the second actuator 600. The image sensor module 400 may include an image sensor 440. The image sensor 440 may be any one among a charge coupled device (CCD), a metal oxide semiconductor (MOS), a charge priming device (CPD), and a charge injection device (CID).

In the present embodiment, the image sensor 440 may be rotated about the x-axis, the y-axis, and the z-axis. The image sensor 440 may be moved based on the x-axis, the y-axis, and the z-axis. The image sensor 440 may be tilted based on the x-axis, the y-axis, and the z-axis.

That is, the image sensor module 400 is coupled to the moving part of the second actuator 600, and when the moving part of the second actuator 600 is moved relative to the fixing part of the second actuator 600, the image sensor module 400 together with the moving part of the second actuator 600 may be moved relative to the fixing part of the second actuator 600. Consequently, the hand shaking correction function may be performed.

As described above, in an embodiment, the AF function may be performed through the first actuator 200 or the liquid lens of the lens module, and the hand shaking correction function may be performed through the second actuator 600. Alternatively, the second actuator 600 may perform both the AF function and the hand shaking correction function.

In the present embodiment, the camera device performs the hand shaking correction function and/or the AF function by moving the image sensor module 400 relative to the lens module 100. That is, with the recent development of a camera technology, an image resolution is increased, and thus a size of the image sensor 440 is also increased. In this case, as the size of the image sensor 440 is increased, a size of the lens module 100 and sizes of parts of an actuator for shifting the lens module 100 are also increased. Due to the increase in size, since a weight of the lens module 100 itself is increased and weights of parts of another actuator for shifting the lens module 100 are also increased, it is difficult to stably shift the lens module 100 using the existing VCM technology, and many problems occur in terms of reliability.

Accordingly, in the present embodiment, the AF function is performed using the first actuator 200 implementing a lens shift method, and the OIS function is performed using the second actuator 600 implementing an image sensor shift method so that the reliability of the camera device can be improved.

In addition, five-axis hand shaking is present in the hand shaking in the camera device. For example, the five-axis hand shaking includes two-axis hand shaking due to an angle, two-axis hand shaking due to a shift, and one-axis hand shaking due to a rotation. In this case, the lens shift method is possible to correct only four-axis hand shaking and is not possible to correct the hand shaking due to the rotation. The reason is that, since the hand shaking occurring due to the rotation should be corrected by the rotation of the optical module, even when the lens module 100 is rotated, an incident optical path is still maintained, and thus the lens shift method is not possible to correct the five-axis hand shaking. Therefore, in the present embodiment, it is possible to correct the five-axis hand shaking by applying the image sensor shift method, and the reliability problem of the lens shift method according to the development of the above-described camera technology may be solved. In addition, since the image sensor shift method is performed using shake information received from gyro sensors located at different arrangement positions, the camera device according to the embodiment may provide a more precise OIS function.

Hereinafter, each component of the camera device according to an embodiment will be described in more detail.

<First Actuator>

FIG. 5 is an exploded perspective view illustrating a first actuator shown in FIG. 4, FIG. 6A is a plan view illustrating a base of FIG. 5, FIG. 6B is a plan view illustrating the first actuator of FIG. 5, and FIG. 6C is a bottom view illustrating the first actuator of FIG. 5.

Referring to FIGS. 5 and 6, the first actuator 200 may include a base 210, a bobbin 220, a first elastic member 230, a second elastic member 240, and a first driver 250.

In the first actuator 200 of the embodiment, the bobbin 220 may be elastically supported on the base 210 through the first elastic member 230 and the second elastic member 240 in the vertical direction, and the bobbin 220 may be moved in the vertical direction due to an electromagnetic interaction of the first driver 250 disposed on the bobbin 220. Accordingly, the lens module 100 coupled to the bobbin 220 may be moved in the optical axis direction. In addition, as the lens module 100 is moved in the optical axis direction, the AF function may be performed.

The base 210 may be a fixing member of the first actuator 200. The base 210 may be disposed inside the first case 300 and coupled thereto.

The base 210 may include a body 211 having a first opening 213 formed in a central portion thereof. The body 211 may have a shape corresponding to the first case 300.

For example, the shape of the body 211 of the base 210 may have a rectangular parallelepiped shape or a quadrangular cross-sectional shape corresponding to the shape of the first case 300.

A plurality of first protrusions 212 are formed on an upper surface of the body 211 of the base 210. The plurality of first protrusions 212 may be formed to protrude upward from the upper surface of the body 211. In addition, corresponding to the plurality of first protrusions 212, a plurality of lower protrusions (not shown) may also be formed to protrude downward from a lower surface of the body 211. The plurality of first protrusions 212 may be fixing protrusions for fixing the first elastic member 230 disposed on the base 210. The plurality of first protrusions 212 may be disposed in four corner regions on the upper surface of the body 211 of the base 210.

The first opening 213 is formed in the body 211 of the base 210. The first opening 213 may have a shape corresponding to a shape of the bobbin 220. For example, the bobbin 220 may have a quadrangular plate shape, and thus the first opening 213 may also have a quadrangular shape. However, the present invention is not limited thereto, and the bobbin 220 may have a cylindrical shape, and thus the first opening 213 may also have a circular shape. A size of the first opening 213 may be greater than a size of the bobbin 220. For example, in a state in which the bobbin 220 is inserted into the first opening 213, a predetermined gap may be present between an inner surface of the body 211 of the base 210 and an outer surface of the bobbin 220.

A stepped bump 215 may be formed on the inner surface of the body 211 of the base 210.

The stepped bump 215 may selectively support the bobbin 220 disposed in the first opening 213 and may restrict movement of the bobbin 220. For example, the stepped bump 215 may serve as a stopper for restricting a downward movement of the bobbin 220.

That is, the bobbin 220 of a normal state may not come into contact with the stepped bump 215 in a state of being disposed in the first opening 213, and when the bobbin 220 is moved to a movement restriction range in a downward direction, the bobbin 220 may come into contact with the stepped bump 215.

Meanwhile, first recesses 217 recessed in an outward direction of inner surfaces of the body 211 of the base 210 may be formed. The first recesses 217 may include a first-first recess 217a and a first-second recess 217b formed in two inner surfaces facing each other among the inner surfaces of the body 211. At least a portion of the bobbin 220 may be disposed in the first-first recess 217a and the first-second recess 217b. For example, a sensor magnet mounting part (not shown) formed in the bobbin 220 may be disposed in the first-first recess 217a and the first-second recess 217b. The first-first recess 217a and first-second recess 217b may be formed to minimize a gap between sensor magnets 253 and 254 mounted in the sensor magnet mounting part of the bobbin 220 and a driver integrated circuit (IC) (not shown) mounted on the flexible circuit board 260.

First drive magnet mounting grooves 216 are formed in regions facing each other based on the first opening 213 of the lower surface of the body 211 of the base 210. That is, a first-first drive magnet mounting groove 216a is formed in a first region of the lower surface of the body 211 of the base 210. A first-second drive magnet mounting groove 216b is formed in a second region facing the first region of the lower surface of the body 211 of the base. A first-first drive magnet 252b may be disposed in the first-first drive magnet mounting groove 216a, and a first-second drive magnet 252a may be disposed in the first-second drive magnet mounting groove 216b. In this case, the first actuator 200 of the embodiment moves the bobbin 220 in the optical axis direction using the two first drive magnets 252a and 252b disposed to face each other. In this case, in order to move the bobbin 220 in the optical axis direction only using the two first drive magnets 252a and 252b, the two first drive magnets 252a and 252b may be disposed to extend in a lengthwise direction. In this case, in order to minimize an overlap region with a second drive magnet (which will be described below) of the second actuator 600 in the optical axis direction, the first drive magnets 252a and 252b may be disposed in regions excluding the corner regions of the lower surface of the body 211. In addition, the first drive magnets 252a and 252b may generate magnetic field interference with the second drive magnet of the second actuator 600. In this case, the first drive magnets 252a and 252b are disposed in a state of being fixed to the body 211 of the base 210. In addition, the second drive magnet of the second actuator 600 is also disposed to be fixed to the fixing part instead of the moving part. As described above, in the embodiment, the first drive magnets 252a and 252b and the second drive magnet are disposed at fixed positions. That is, in the embodiment, coils are disposed on portions which are moved according to the lens shift and the image sensor shift, and thus the drive magnets are continuously located at the fixed positions to minimize mutual magnetic field interference.

Meanwhile, the body 211 of the base 210 includes a board groove 214 into which the flexible circuit board 260 is inserted. In this case, the flexible circuit board 260 may be inserted into the board groove 214 in a state of being vertically erected. In this case, the board groove 214 may have a shape which is bent at least one time. That is, the flexible circuit board 260 is inserted into the board groove 214. In this case, the flexible circuit board 260 includes a driver IC disposed on one surface. The driver IC may be a driver in which a Hall sensor is embedded. Accordingly, the driver IC may detect a variation in strength of an electric field which is varied according to the positions of the sensor magnets 253 and 254, detect a position of the lens module 100, and control an output signal.

In this case, the driver IC is disposed to face the sensor magnets 253 and 254. In this case, when a distance between the sensor magnets 253 and 254 and the driver IC is decreased, accuracy of position sensing information of the bobbin 220 or the lens module 100 acquired through the driver IC can be improved. In addition, the flexible circuit board 260 includes the terminal 262 which is electrically connected to a first board (which will be described below) of the second actuator 600. In this case, for an electrical connection between the terminal 262 and the first board, a soldering process or the like should be performed. Accordingly, the terminal 262 should be located close to an outer surface of the base 210.

That is, the flexible circuit board 260 includes a first board region 261 in which the terminal 262 is disposed and a second board region 262 in which the driver IC is disposed. In addition, the first board region 261 of the flexible circuit board 260 is located adjacent to the outer surface of the base 210, and the second substrate region 263 is located adjacent to the inner surface of the base 210. To this end, a bent region may be included between the first board region 261 and the second substrate region 263.

The bobbin 220 is disposed in the first opening 213 of the base 210.

A second opening 221 may be formed in a central portion of the bobbin 220. The second opening 221 may have a shape corresponding to the lens module 100. For example, the second opening 221 may have a circular shape corresponding to the shape of the lens module 100, but the present invention is not limited thereto. The bobbin 220 may be coupled to the lens module 100. For example, the lens module 100 may be inserted into the second opening 221 of the bobbin 220 and be coupled to the bobbin 220.

A plurality of second protrusions 223 coming into contact with the first elastic member 230 may be formed on an upper surface of the bobbin 220. The plurality of second protrusions 223 may be stoppers which allow the bobbin 220 to be elastically supported on the first elastic member 223 and restrict a movement range of the bobbin 220 in an upward direction. For example, when the bobbin 220 is out of the movement range in the upward direction, the second protrusions 223 may come into contact with an inner surface of the upper surface of the first case 300 located on the bobbin 220, thereby restricting the movement of the bobbin 220.

A coil winding part 222 on which a first coil 251 is wound may be formed on the outer surface of the bobbin 220. For example, the coil winding part 222 in the form of a recess recessed in an inward direction of the outer surface of the bobbin 220 may be formed. In addition, the first coil 251 may be wound on the coil winding part 222. The first coil 251 may be in the form of a "coil block." The first coil 251 may be an "electromagnet." The first coil 251 is disposed to face the first drive magnets 252a and 252b, and thus the first coil 251 may electromagnetically interact with the first drive magnets 252a and 252b to generate an electromagnetic force. In this case, the first coil 251 may be electrically connected to the second elastic member 240. Accordingly, the first coil 251 may receive a current from the second elastic member 240 to generate an electromagnetic force.

Consequently, the bobbin 220 may be moved in the optical axis direction to perform the AF function.

Sensor magnet mounting parts (not shown), which protrude toward the inner surface of the base 210 and in which the sensor magnets 253 and 254 may be disposed, may be formed on the remaining outer surfaces of the bobbin 220 excluding the outer surfaces facing the first drive magnets 252a and 252b. In addition, the sensor magnets 253 and 254 may be mounted on the sensor magnet mounting parts and be located in the first-first recess 217a and the first-second recess 217b of the base 210. As the bobbin 220 is moved, the sensor magnets 253 and 254 are moved together with the bobbin 220. In addition, a magnitude of the magnetic field detected by the driver IC disposed on the flexible circuit board 260 is varied according to the positions of the sensor magnets 253 and 254, and the driver IC may detect the positions of the sensor magnets 253 and 254, further, the position of the bobbin 220, and furthermore the position of the lens module 100 on the basis of the magnitude of the magnetic field which is varied.

The first elastic member 230 is disposed above the base 210 and the bobbin 220. The second elastic member 240 is disposed below the base 210 and the bobbin 220. Accordingly, the bobbin 220 may be elastically supported by the first elastic member 230 and the second elastic member 240 in the first opening of the base 210 in the vertical direction.

The first elastic member 230 may be a plate spring. The first elastic member 230 may be formed of a metal. Alternatively, the first elastic member 230 may be formed of a non-magnetic material.

Accordingly, the first elastic member 230 may not be affected by the magnetic forces of the first drive magnets 252a and 252b and the electromagnetic force of the first coil 251.

The first elastic member 230 may be disposed on the base 210. In addition, the first elastic member 230 may be disposed above the bobbin 220. The first elastic member 230 may be coupled to the base 210 and the bobbin 220. That is, the first elastic member 230 may include a first-first elastic part 231 coupled to the base 210 and a first-second elastic part 233 extending from the first-first elastic part 231 to be coupled to the bobbin 220. Coupling grooves 232 may be formed in the first-first elastic part 232 and be inserted into the plurality of first protrusions 212 disposed on the upper surface of the body 211 of the base 210. Accordingly, the first elastic member 230 may elastically support an upper side of the bobbin 220 in a state in which the coupling grooves 232 are coupled to the first protrusions 212. In addition, the first elastic member 230 may include an opening 234 into which the lens module 100 is inserted in a central portion of the first elastic member 230.

The second elastic member 240 may be disposed below the base 210. In addition, the second elastic member 240 may be disposed below the bobbin 220. The second elastic member 240 may be coupled to the base 210 and the bobbin 220. That is, the second elastic member 240 may include a second-first elastic part 241 coupled to the base 210, and a second-second elastic part 242 coupled to the bobbin 220. Accordingly, the second elastic member 240 may elastically support a lower side of the bobbin 220 in a state of being coupled to the base 210. In addition, the second elastic member 240 may include an opening 243 into which the lens module 100 is inserted in a central portion of the second elastic member 240.

The second elastic member 240 may be electrically connected to the first coil 251. The second elastic member 240 may be electrically connected to the flexible circuit board 260. The second elastic member 240 may electrically connect the first coil 251 and the flexible circuit board 260. Therefore, a current may be supplied from the flexible circuit board 260 to the first coil 251 through the second elastic member 240. In this case, a direction, a wavelength, and an intensity of the current supplied to the first coil 251 may be controlled.

<Second Actuator>

Hereinafter, the second actuator 600 will be described.

The second actuator 600 may be located below the first actuator 200 and may separately operate from the first actuator 200 to shift the image sensor module 400. To this end, the second actuator 600 may include a fixing part 700 of which a position is fixed, a moving part 900 of which a position is moved due to an electromagnetic force of the driver in a state of being coupled to the fixing part, and a support for elastically supporting the moving part. Hereinafter, the fixing part 700 may correspond to a fixing board 700, the moving part 900 may correspond to a moving board which will be described below, the support may include a wire 800 and correspond to a connection wire 800 which will be described below, and these terms may be used interchangeably.

FIG. 7 is an exploded perspective view illustrating a second actuator according to an embodiment, FIG. 8 is a schematic cross-sectional view illustrating a connection relationship between a first board and a moving part of FIG. 7, FIG. 9 is an exploded perspective view illustrating a fixing part of FIG. 7, FIG. 10 is a bottom view illustrating the fixing part of FIG. 7, FIG. 11 is a diagram illustrating an upper surface of the first board in more detail, FIG. 12 is an exploded perspective view illustrating the moving part according to an embodiment, FIG. 13A is a plan view illustrating a second board, FIG. 13B is a bottom view illustrating the second board, FIG. 14A is a plan view illustrating a third board, FIG. 14B is a bottom view illustrating the third board, FIG. 15 is an exploded perspective view illustrating a fourth board, FIG. 16 is a plan view illustrating the fourth board, FIG. 17 is an enlarged view illustrating a specific region of FIG. 16, and FIG. 18 is a diagram illustrating the coupling of the third board and the fourth board.

Referring to FIGS. 7 to 17, the second actuator 600 may include the fixing board 700, the moving board 900, the connection wire 800, and a board housing 1000.

The fixing board 700 is electrically connected to the moving board 900 by the connection wire 800. Here, a length of the connection wire 800 may be greater than the sum of a thickness of the fixing board 700 and a thickness of the moving board 900. Accordingly, the moving board 900 located below the fixing board 700 is placed at a position spaced apart from the fixing board 700 by a predetermined distance. That is, in a state of being suspended from a lower portion of the fixing board 700 by the connection wire 800 (a fly state), the moving board 900 may be moved relative to the fixing board 700 due to an electromagnetic force generated by a magnet and a coil, which will be described below.

The connection wire 800 may connect the fixing board 700 to the moving board 900. The connection wire 800 may have elasticity. The connection wire 800 may be an elastic member. The connection wire 800 may be a wire spring. In a state in which the fixing board 700 is spaced apart from the moving board 900 by a predetermined distance, the connection wire 800 may connect a circuit pattern of the fixing board 700 and a circuit pattern of the moving board 900. The connection wire 800 may be formed of a metal. The connection wire 800 may elastically support movement of the moving board 900.

The connection wire 800 may include a plurality of wires. The number of the plurality of wires may correspond to the number of channels of signals transmitted and received between the moving board 900 and the fixing board 700. The connection wire 800 may include a total of 36 wires, i.e., nine wires for each side located between adjacent corners among four corners of each of the fixing board 700 and the moving board 900.

For example, the connection wire 800 may include nine first wires 810 disposed on a first side surface, nine second wires 820 disposed on a second side surface, nine third wires 830 disposed on a third side surface, and nine fourth wires 840 disposed on a fourth side surface of each of the fixing board 700 and the moving board 900.

As described above, the connection wire 800 may be uniformly distributed and disposed on the four side surfaces. That is, the connection wires 800 on side surfaces facing each other among the four side surfaces may be symmetrical with each other. In this case, the connection wires 800 should transmit the signals and elastically support the moving board 900 against the fixing board 700. Here, when the connection wires 800 are asymmetrically disposed, the moving board 900 does not perform a normal shift operation, a difference occurs in an amount of movement between a portion in which more connection wires are disposed and the remaining portion, and thus a problem may occur in operational reliability. Therefore, in the embodiment, the connection wire 800 is uniformly disposed in each region in the form of a circle to improve reliability of an image sensor shift operation.

The board housing 1000 is disposed below the fixing board 700, and the moving board 900 is accommodated in the board housing 1000. The second actuator 600 configured as described above will be described in detail as follows.

The fixing board 700 may include a first board 710, a magnet holder 720, and a magnet 730. The first board 710 may include a first board region 711 in which a first opening 712 is formed in a central portion, and a second board region 716 which extends from the first board region 711 and in which a connector connected to an external device is disposed.

The first board 710 may include a first lead pattern portion 713 disposed in the first board region 711. The first board 710 may be coupled to the connection wire 800 in the first lead pattern portion 713. That is, one end of the connection wire 800 may be coupled to the first lead pattern portion 713 of the first board 710. The coupling of the first lead pattern portion 713 and the connection wire 800 may be achieved through soldering. The first lead pattern portion 713 may be a portion in which a solder resist is open for an electrical connection with the connection wire 800.

Specifically, the first lead pattern portion 713 includes a first hole 713-2 and a first lead pattern portion 713-3 disposed to surround the first hole 713-2. That is, the first lead pattern portion 713 may be a pad including the first hole 713-2 through which the connection wire 800 passes. Accordingly, in a state in which the connection wire has passed through the first hole 713-2, soldering is performed, and thus the connection wire 800 may be electrically connected to the lead pattern part 713-1 disposed around the first hole 713-2.

The first lead pattern portion 713 is formed as a plurality of first lead pattern portions. That is, the first lead pattern portion 713 includes a plurality of first lead patterns. In addition, the plurality of first lead patterns are connected to the connection wire 800. In this case, the number of the first lead patterns may be less than or equal to the number of the connection wire 800. When the number of the first lead patterns is equal to the number of the connection wire 800, all the first lead patterns may be coupled to the connection wire. In addition, when the number of the first lead patterns is less than the number of the connection wire 800, at least one of the first lead patterns may not be coupled to the connection wire.

A connector may be disposed in the second board region 716 connected to the first board region 711. The connector may be a port for electrical connection with an external device.

In this case, the first board region 711 may be disposed in the camera device, and the second board region 716 may extend from the first board region 711 to be exposed to the outside of the camera device.

That is, the first board region 711 may be disposed in the first case 300, and the second board region 716 may be disposed outside the first case 300 and include the connector connected to an external device.

The first board 710 may transmit a signal to the moving board 900 and receive a signal transmitted from the moving board 900. That is, the first board 710 is electrically connected to the moving board 900 through the connection wire 800. Thus, the first board 710 may transmit a power signal or communication signal to the moving board 900 through the connection wire 800 and receive information including an image signal acquired from the moving board 900.

The first board 710 may include a first pad 714 disposed in an edge of the first board region 711. The first pad 714 may be electrically connected to the flexible circuit board 260 included in the first actuator 200.

At least one first coupling hole 715 is formed in a corner region of the first board region 711 of the first board 710. The first coupling hole 715 may be formed to fix the first board 710 on the magnet holder 720.

The first board 710 may be located in a state of being fixed inside the first case 300 of the camera device. That is, the first board 710 may be disposed in a state of being fixed in position without being moved.

The magnet holder 720 is disposed below the first board 710. The magnet holder 720 may be provided with a board seating part 721 having an upper surface on which the first board 710 is seated. In addition, a first coupling protrusion 722, which is coupled to the first coupling hole 715 formed in the first board 710, may be formed in the board seating part 721.

In a state in which the first coupling hole 715 is inserted into the first coupling protrusion 722, the first board 710 may be seated on the board seating part 721.

In this case, the magnet holder 720 may include an opening portion overlapping the first opening 712 of the first board 710 in the optical axis direction. In addition, in the magnet holder 720, portions overlapping the first lead pattern portions 713 formed in the first actuator 200 in the optical axis direction may be open.

The first board 710 may include a gyro sensor 717 disposed on a lower surface of the first board 710. That is, in the present embodiment, the gyro sensor 717 may be disposed on the lower surface of the first board 710 and be accommodated in the first case 300 of the camera device.

That is, in the present embodiment, the gyro sensor 717 for implementing the hand shaking prevention function may be embedded in a state of being mounted on the lower surface of the first board 710, and angular velocity/linear velocity detection information due to hand shaking may be fed back to the moving board 900. Accordingly, in the embodiment, since the gyro sensor 717 is disposed in a space between the first board 710 and the moving board 900, there is an effect in which it is not necessary to provide an additional space for the arrangement of the gyro sensor 717.

A magnet seating groove (not shown) in which the magnet 730 is disposed may be formed in a lower surface of the magnet holder 720. The magnet 730 may be disposed in the magnet seating groove of the magnet holder 720. In this case, the magnet 730 may be disposed to face a coil 916 disposed on the moving board 900. In this case, when a current is applied to the coil 916, an electric field may be formed around the coil 916. When a current is applied to the coil 916, the coil 916 may be moved relative to the magnet 730 through electromagnetic interaction between the coil 916 and the magnet 730.

In this case, the magnet 730 may be disposed at each corner of the lower surface of the magnet holder 720. That is, the magnet 730 may be disposed at each of four corners of the lower surface of the magnet holder 720. In addition, the magnet 730 may face the coil. The magnet 730 may be a flat magnet in the form of a flat plate shape.

The magnet 730 may include a plurality of magnets. The magnet 730 may include four magnets. The magnet 730 may include first to fourth magnets 731, 732, 733, and 734.

The first magnet 731 may face a first coil 916-1 disposed on the moving board 900. The first magnet 731 may be disposed on a first corner disposed at an upper left side of the magnet holder 720.

The second magnet 732 may face a second coil 916-2 disposed on the moving board 900. The second magnet 732 may be disposed on a second corner disposed at an upper right side of the magnet holder 720.

The third magnet 733 may face a third coil 916-3 disposed on the moving board 900. The third magnet 733 may be disposed on a third corner disposed at a lower right side of the magnet holder 720.

The fourth magnet 734 may face a fourth coil 916-4 disposed on the moving board 900. The fourth magnet may be disposed on a fourth corner disposed at a lower left side of the magnet holder 720.

The magnets constituting the magnet 730 may be disposed perpendicular to magnets adjacent thereto and be disposed parallel to magnets disposed in a diagonal direction.

Here, polarity of a surface of the first magnet 731 facing the coil 916 may be different from a portion of the surface close to one side and a portion thereof close to the other side. In addition, polarity of a surface of the second magnet 732 facing the coil 916 may be different from a portion of the surface close to one side and a portion thereof close to the other side. Here, polarities of a surface of the third magnet 733 facing the coil 916 may be different between a portion of the surface close to one side and a portion thereof close to the other side.

Polarities of a surface of the fourth magnet 734 facing the coil 916 may be different between a portion of the surface close to one side and a portion thereof close to the other side.

In addition, the first magnet 731 and the third magnet 733 may be disposed in the same direction, and the second magnet 732 and the fourth magnet 734 may be disposed in the same direction.

The first magnet 731 may be disposed perpendicular to the second magnet 732. The polarities of the first to fourth magnets 731, 732, 733, and 734 may be the same in inner portions thereof. The polarities of the first to fourth magnets 731, 732, 733, and 734 may be the same in outer portions thereof. The polarity of each inner portion of the first to fourth magnets 731, 732, 733, and 734 may be formed as an N pole. The polarity of each outer portion of the first to fourth magnets 731, 732, 733, and 734 may be formed as an S pole. However, as a modified embodiment, the polarity of each inner portion of the first to fourth magnets 731, 732, 733, and 734 may be formed as an S pole and the polarity of each outer portion may be formed as an N pole.

Meanwhile, as shown in FIG. 10, one end of the connection wire 800 may be coupled to the first lead pattern portion 713 of the first board 710 and pass through the first hole 713-2 constituting the first lead pattern portion 713 to extend to a lower portion of the first board 710.

As described above, the fixing board 700 may be formed such that the first board 710 is disposed on the upper surface of the magnet holder 720, and the magnet 730 is disposed on the lower surface thereof based on the magnet holder 720. In addition, a gyro sensor for acquiring sensing information necessary to perform hand shaking correction is disposed on the lower surface of the first board 710, and a signal acquired through the gyro sensor may be transmitted to the moving board 900 through the connection wire 800.

The board housing 1000 may be disposed below the fixing board 700. The board housing 1000 is coupled to the lower portion of the fixing board 700. A seating portion (not shown) on which the magnet holder 720 constituting the fixing board 700 is mounted may be provided in the board housing 1000, and thus the board housing 1000 may be coupled to the magnet holder 720. In addition, the moving board 900 is disposed in the board housing 1000 coupled to the magnet holder 720.

The moving board 900 may be electrically connected to the fixing board 700 through the connection wire 800 and be moved relative to the fixing board 700 due to an interaction between the magnet 730 and the coil 916.

To this end, the moving board 900 may include a second board 910, a board holder 920, a third board 930, and a fourth board 940. Here, that is, the second board 910, the third board 930, and the fourth board 940 may be second boards constituting the moving board 900. In addition, the first board 710 may be a first board constituting the fixing board 700.

The second board 910 may be a main board. The second board 910 may be a drive board for driving the second actuator.

The second board 910 may include a second opening 911. In this case, the second opening 911 may overlap the first opening 712 formed in the first board 710 in the optical axis direction.

The second board 910 may include a coil 916 disposed at each corner thereof. The coil 916 may be electrically connected to the second board 910. The coil 916 may be disposed to face the magnet 730 disposed in the first actuator 200. When a current is applied to the coil 916, an electric field may be formed around the coil 916.

The coil 916 may include four coils. In this case, a current may be independently applied to at least three coils among the four coils. In a first example, the coil 916 may be controlled through three channels. Alternatively, in a second example, the coil 916 may be controlled through each of four individual channels. The four coils constituting the coil 916 may be electrically separated from each other. Any one of a forward current and a reverse current may be selectively applied to each of the four coils of the coil 916. In the present embodiment, only three coils among the four coils may be electrically separated from one coil, and the one coil may be electrically connected to another coil. Alternatively, all four coils may be electrically separated from each other. When only the three coils among the four coils are electrically separated, three pairs of six lead wires may be drawn from the coil 916, and when all the four coils are electrically isolated, four pairs of eight lead wires may be drawn from the coil 916.

As in the first example of the present embodiment, when the four coils are controlled through three channels, one pair of the coil 916 and the magnet 730 should be driven in rotation driving about the z-axis. However, as in the second example, when the four coils are controlled through four channels, two pairs of the coil 916 and the magnet 730 may be driven in the rotation driving about the z-axis.

The coil 916 may include first to fourth coils 916-1, 916-2, 916-3, and 913-4. In addition, the first to fourth coils 916-1, 916-2, 916-3, and 913-4 may be disposed to face magnets of the magnet 730 disposed on the first board 710.

The first coil 916-1 may be disposed on a first corner of the second board 910. The second coil 916-2 may be disposed on a second corner of the second board 910. The third coil 916-3 may be disposed on a third corner of the second board 910. The fourth coil 916-4 may be disposed on a fourth corner of the second board 910. The first coil 916-1 and the third coil 916-3 may be disposed in a first diagonal direction of the second board 910, and the second coil 916-1 and the fourth coil 916-4 may be disposed in a second diagonal direction of the second board 910.

In the present embodiment, the first coil 916-1 and the third coil 916-3 may be disposed to extend in a first direction, and the second coil 916-2 and the fourth coil 916-4 may be disposed to extend in a second direction. In this case, the first direction may be perpendicular to the second direction. A long side of the first coil 916-1 may be disposed parallel to a long side of the third coil 916-3. A long side of the second coil 916-2 may be disposed parallel to a long side of the fourth coil 916-4. The long side of the first coil 916-1 may not be disposed parallel to the long side of the second coil 916-2. In this case, an imaginary extension line of the long side of the first coil 916-1 may be disposed to be orthogonal to an imaginary extension line of the long side of the second coil 916-2. An arrangement direction of the first coil 916-1 may be orthogonal to an arrangement direction of the second coil 916-2.

In the present embodiment, a current may be independently applied to at least three coils among the first to fourth coils 916-1, 916-2, 916-3, and 913-4. The first to fourth coils 916-1, 916-2, 916-3, and 913-4 may be electrically separated from each other.

Meanwhile, a Hall sensor 917 may be disposed inside each of the first to fourth coils 916-1, 916-2, 916-3, and 913-4. In this case, in the embodiment, the Hall sensor 917 may be disposed inside each of only three coils among the first to fourth coils 916-1, 916-2, 916-3, and 913-4. Since the first to fourth coils 916-1, 916-2, 916-3, and 913-4 are controlled through three channels in the first example, the Hall sensor 917 does not need to be provided in one coil. The Hall sensor 917 may detect a magnetic force of the magnet 730. Movement of the image sensor module may be detected in real time through the magnetic force of the magnet 730 detected by the Hall sensor 917. In addition, through the detected movement, OIS feedback control may be possible.

The Hall sensor 917 may be formed as a plurality of Hall sensors. That is, as described above, the Hall sensor 917 may include three sensors. Movement in the x-axis direction, movement in the y-axis direction, and a rotation about the z-axis of the image sensor 440 may be detected through the three sensors. The Hall sensor 917 may include first to third sensors. The first sensor may face the first magnet, the second sensor may face the second magnet, and the third sensor may face the third magnet.

The Hall sensor 917 may include a first Hall sensor which detects a movement amount and/or a displacement of the magnet 730 in the x-axis direction. The Hall sensor 917 may include a second Hall sensor which detects a movement amount and/or a displacement of the magnet 730 in the y-axis direction. The Hall sensor 917 may include a third Hall sensor which detects movement amounts and/or displacements of the magnet 730 in the x-axis direction or the y-axis direction. A rotation movement of the magnet 730 about the z-axis may be detected through any two or more among the first Hall sensor, the second Hall sensor, and the third Hall sensor.

A driver IC 914 for controlling an operation of the second actuator may be disposed on the second board 910. In addition, various passive elements 915 for the operation of the second actuator may be disposed on the second board 910.

In this case, the second board 910 should connect the coil 916, the driver IC 914, and the passive elements 915 to each other and then connect the coil 916, the driver IC 914, and the passive elements 915 to the first board 710. Here, the number of terminals required for connecting the second board 910 to the first board 710 may be 12. The 12 terminals may be terminals connected to the driver IC 914.

Accordingly, a plurality of second pads 918 connected to the driver IC 914 are disposed on a lower surface of the second board 910. The number of the plurality of second pads 918 may be 12 so as to control components disposed on the second board 910 in the driver IC 914 and transmit/receive necessary signals.

Meanwhile, a second hole 912 may be formed in an edge of the second board 910. In this case, the second hole 912 may be aligned with the first hole 713-2 formed in the first board 710 in the optical axis direction. The second hole 912 may be a wire through-hole through which the connection wire 800 coupled to the first board 710 passes.

In addition, a third coupling hole 913 is formed in the edge of the second board 910. The second board 910 is disposed on the board holder 920.

In this case, the board holder 920 includes a guide protrusion 921 extending upward from the edge. The guide protrusion 921 may be formed on an upper surface of the board holder 920. The guide protrusion 921 may guide an assembly position of the second board 910. In a state in which the second board 910 is seated on the board holder 920, the guide protrusion 921 may be in contact with a side surface of the second board 910. In this case, the guide protrusion 921 may be formed as a plurality of guide protrusions 921, and thus the guide protrusions 921 may be in contact with all four side surfaces of the second board 910.

A third coupling protrusion 923 may be formed on a corner of the board holder 920. In a state in which the second board 910 is seated on the board holder 920, the third coupling protrusion 923 may be inserted into the third coupling hole 913 formed in the second board 910. In this case, the third coupling protrusion 923 may be formed in a shape corresponding to the third coupling hole 913. The third coupling protrusion 923 may be formed on each of four corners of the board holder 920.

A third hole 922 may be formed in an edge of the board holder 920. In this case, the third hole 922 may be aligned with the second hole 912 formed in the second board 910 and the first hole 713-2 formed in the first board 710 in the optical axis direction. The third hole 922 may be a wire through-hole through which the connection wire 800 coupled to the first board 710 passes. Meanwhile, an opening may be provided in a central portion of the board holder 920.

In addition, the third board 930 may be disposed in the opening of the board holder 920.

The third board 930 may intervene an interconnection between the image sensor module 400, the second board 910, and the fourth board 940.

The third board 930 includes an opening 931 in a central portion thereof. The opening 931 may be aligned with the opening of the first actuator 200 and the opening of the second board 910, which are disposed above the opening 931, in the optical axis direction.

The third board 930 may include a third pad 932. The third pad 932 may face the second pad 918 included in the second board 910. That is, the third pad 932 may be disposed and aligned with the second pad 918 in the optical axis direction. In addition, the third pad 932 may be formed as 12 pads to correspond to the number of the second pad 918. The second pad 918 and the third pad 932 may be electrically connected to each other through soldering.

In this case, the board holder 920 may facilitate the coupling of the second board 910 and the third board 930. That is, in the embodiment, when the board holder 920 is disposed between the second board 910 and the third board 930, a pitch of the second pad 918 may match a pitch of the third pad 932, and the coupling of the second board 910 and the third board 930 may be facilitated. However, the board holder 920 is not an essential component and may be omitted in some cases.

Meanwhile, the third board 930 includes fourth pads 934 formed on an inner side of a lower surface and fifth pads 935 formed on an edge of the lower surface.

The fourth pad 934 may be connected to a pad of the image sensor module 400 disposed in the opening 931 of the board holder 920.

In this case, the fourth pad 934 includes a fourth-first pad 934-1 formed in a first region of the lower surface of the third board 930 and a fourth-second pad 934 formed in a second region facing the first region with the opening 931 interposed therebetween.

In this case, the fourth-first pad 934-1 is a pad for receiving an image signal acquired through the image sensor 440 among signals received from and transmitted to the image sensor module 400. In this case, the fourth-first pad 934-1 is a pad for receiving and transmitting signals, excluding the image signal, from and to the image sensor 440.

That is, in the present embodiment, the pads connected to the image sensor module 400 are separated into the pad for receiving the image signal and other pads, and the pad for receiving the image signal and the other pads are disposed in different regions. When the pad for receiving the image signal and the pad for receiving the signals, excluding the image signal, are disposed in the same region, the image signal may include a noise signal, and thus there is a problem in that image quality is degraded. Accordingly, in the embodiment, as described above, the pad for receiving the image signal and the other pads are separately disposed in different regions so that quality of the image signal can be improved.

In this case, the third pad 932 and the second pad 918 are disposed in regions overlapping the fourth-second pad 935-2 in the optical axis direction other than in regions overlapping the fourth-first pad 935-1 in the optical axis direction.

Accordingly, due to the signals transmitted to the third pad 932 and the second pad 918, a noise included in the image signal can be minimized.

In addition, the second board 910 includes the driver IC 914 and the passive elements 915. The driver IC 914 and the passive elements 915 are disposed in a region overlapping the fourth-second pad 934-2 in the optical axis direction other than in a region overlapping the fourth-first pad 934-1 in the optical axis direction. This is to prevent signal lines or devices overlapping the fourth-first pad 934-1 from being present in the optical axis direction so that a noise is prevented from being included in the image signal.

Meanwhile, the third board 930 includes the fifth pad 935 disposed in the edge thereof. The fifth pad 935 is a pad connected to the fourth board 940. In this case, the fifth pads 935 may be connected to a plurality of connection wires 800 in one-to-one manner through the fourth board 940. Accordingly, the fifth pad 935 may include a fifth-first pad 935-1 disposed on a first edge of the lower surface of the third board 930, a fifth-second pad 935-2 disposed on a second edge thereof, a fifth-third pad 935-3 disposed on a third edge thereof, and a fifth-fourth pad 935-4 disposed on a fourth edge thereof. In this case, in order to minimize a signal line distance, the fourth-first pad 935-1 is preferentially connected to the fifth-first pad 935-1 and directly transmits the image signal to the first board 710 through the fourth board 940 and the connection wire 800. That is, in the present embodiment, a signal path through which the image signal is transmitted is shortened and other pads or other devices are not disposed on the signal path through which the image signal is transmitted so that the quality of the image signal may be maintained at the highest level.

The fourth board 940 allows the image sensor module 400 to be shifted and allows signals to be transmitted.

The fourth board 940 may include an insulating layer 941 and a pattern portion 942 disposed on the insulating layer 941.

The insulating layer 941 may include an opening 941-2. The opening 941-2 may be aligned with the opening of the first board 710, the opening of the second board 910, the opening of the third board 930, and the opening of the board holder 920 in the optical axis direction.

The pattern portion 942 is disposed on the insulating layer 941. In this case, one end of the pattern portion 942 is connected to the fifth pad 935 of the third board 930, and the other end thereof includes a second lead pattern 942-1 connected to the connection wire 800. In addition, the pattern portion 942 includes a reinforcement pattern 942-2 disposed on each corner of the insulating layer 941. The second lead pattern 942-1 is a signal transmission/reception pattern which is electrically connected to the fifth pad 935 of the third board 930 and the connection wire 800. In addition, the reinforcement pattern 942-2 is a pattern for reinforcing rigidity of the fourth board 940 by being disposed on the corner of the insulating layer 941. Accordingly, the reinforcement pattern 942-2 is not electrically connected to other components and is merely disposed on the corner, on which the second lead pattern 942-1 is not disposed, of an upper surface of the insulating layer 941 to improve the rigidity of the fourth board 940. In this case, the reinforcement pattern 942-2 may be formed of the same metal material as the second lead pattern 942-1 and may be simultaneously formed with the second lead pattern 942-1 in the same process.

The second lead pattern 942-1 may be formed as a plurality of lead patterns. For example, the second board 910 may include 36 terminals corresponding to the connection wire 800.

In this case, the second board 910 may include a second-first lead pattern 942-1*a* disposed in a first region of the insulating layer 941, a second-third lead pattern 942-1*c* disposed in a second region facing the first region of the insulating layer 941, a second-second lead pattern 942-1*b* disposed in a third region between the first and second regions of the insulating layer 941, and a second-fourth lead pattern 942-*id* disposed in a fourth region facing the third region of the insulating layer 941. That is, the second lead pattern 942-1 may include a plurality of second lead patterns disposed in different regions. In this case, the number of the second lead patterns may be equal to the number of the connection wires. In addition, the number of the second lead patterns may be less than the number of the connection wires. In this case, when the number of the second lead patterns is less than the number of the connection wires, at least one among the second lead patterns may not be coupled to the connection wire.

In addition, the reinforcement pattern 942-2 includes a first reinforcement pattern 942-2*a* disposed on a first corner between the first region and the third region of the insulating layer 941, a second reinforcing pattern 942-2*b* disposed on a second corner between the third region and the second region of the insulating layer 941, a third reinforcing pattern 942-2*c* disposed on a third corner between the second region and the fourth region of the insulating layer 941, and a fourth reinforcing pattern 942-2*d* disposed on a fourth corner between the first region and the fourth region of the insulating layer 941.

In this case, the insulating layer 941 has the opening 941-2 in the central portion thereof and includes a first insulating region 941-1 in contact with the second lead pattern 942-1 and the reinforcement pattern 942-2, and a second insulating region 941-3 protruding outward from an outer surface of the first insulating region 941-1. The second insulating region 941-3 may be formed to increase a contact area with the reinforcement pattern 942-2, thereby further improving rigidity of the fourth board 940.

Meanwhile, the reinforcement pattern 942-2 may further include a coupling hole 943-3 into which a coupling protrusion (not shown) disposed on the lower surface of the board holder 920 is inserted.

Meanwhile, the second lead pattern 942-1 includes a first portion 942-11 disposed on the insulating layer 941, a third portion 942-13 coupled to the connection wire 800, a second portion 942-12 which connects the first portion 942-11 and the third portion 942-13, and a fourth portion 942-14 which extends from the first portion 942-11 in an inward direction of the insulating layer 941 and is coupled to the fifth pad 935 of the third board 930.

Here, the first portion 942-11 may be referred to as a body of the second lead pattern 942-1. That is, the first portion 942-11 may be a body of the second lead pattern 942-1 which is disposed on the insulating layer to support another portion of the insulating layer. In addition, the third portion 942-13 may be referred to as a coupler coupled to the connection wire 800. In addition, the second portion 942-12 may be a connector for connecting the first portion 942-11 to the third portion 942-13. In addition, the fourth portion 942-14 may be referred to as a coupler coupled to the fifth pad 935 and, alternatively, may be referred to as a pad.

In addition, a hole through which the connection wire 800 passes may be formed in the third portion 942-13. The third portion 942-13 may be coupled to the connection wire 800 by soldering. The second portion 942-12 may include a bent portion. The second portion 942-12 may be bent a plurality of times in one direction. The second portion 942-12 may have elasticity. Thus, the second lead pattern 942-1 may have elasticity.

In this case, when the second portion 942-12 does not include a bent portion, the connection wire 800 may be moved when the image sensor module 400 is moved, and thus a bending may occur, and breakage may occur according to a degree of the bending. In contrast, in the embodiment, since the second portion 942-12 includes a bent portion, the second portion 942-12 may serve as a suspender when the image sensor module 400 is moved. Thus, elasticity is given to the connection wire 800 so that rigidity of the connection wire 800 may be increased.

The fourth portion 942-14 may be electrically connected to the fifth pad 935 of the third board 930. In this case, the insulating layer 941 is disposed only below the first portion 942-11 of the second lead pattern 942-1 and is not disposed in the remaining portions thereof.

The third portion 942-13 may be a bonding pad which is electrically connected to the connection wire 800. That is, the third portion 942-13 may be a soldering pad which is soldered to the connection wire 800. To this end, the third portion 942-13 may include a fourth hole through which the connection wire 800 passes. In addition, the fourth hole may be aligned with the third hole 922 of the board holder 920, the second hole 912 of the second board 910, and the first hole 713-2 of the first board 710 in the optical axis direction.

The second portion 942-12 may connect the first portion 942-11 to the third portion 942-13. To this end, the second portion 942-12 may include a plurality of bent portions that are bent. In this case, the second lead patterns 942-1a, 942-1b, 942-1c, and 942-id may be bent in the same direction. For example, each of the second lead patterns 942-1a, 942-1b, 942-1c, and 942-1d may include a bent portion of the second portion 942-12 which is bent in a clockwise direction. That is, the second portion 942-12 may be bent in a direction corresponding to the rotation direction of the image sensor module in the z-axis direction. Accordingly, when the image sensor module is rotated in the z-axis direction, the second portion 942-12 may minimize damage applied to the second lead pattern 942-1, and thus it is possible to prevent cracks from being generated in the second lead pattern 942-1 and prevent the second lead pattern 942-1 from being separated from the insulating layer 941. Meanwhile, in the embodiment, an adhesive member (not shown) may be disposed between the insulating layer 941 and the second lead pattern 942-1. In order to prevent the second lead pattern 942-1 from being separated from the insulating layer 941, the adhesive member may be interposed between the insulating layer 941 and the second lead pattern 942-1. The adhesive member may include a curing adhesive or the like. In addition, in order to increase adhesive strength with the second lead pattern 942-1, the adhesive member may be electrolytically plated, and thus roughness may be given to a surface of the adhesive member.

Meanwhile, the second lead pattern 942-1 is a line which transmits an electrical signal and may be formed of a metal material having high electrical conductivity. To this end, the second lead pattern 942-1 may be formed of at least one metal material selected from among gold (Au), silver (Ag), platinum (Pt), titanium (Ti), tin (Sn), copper (Cu), and zinc (Zn). Alternatively, the second lead pattern 942-1 may be formed of a paste or a solder paste which includes at least one metal material selected from among Au, Ag, Pt, Ti, Sn, Cu, and Zn which have high bonding strength.

The second lead pattern 942-1 may be formed of a metal material which serves as a line transmitting an electrical signal and has an elastic force capable of moving the image sensor module 400 in the x-axis, y-axis, and z-axis directions. To this end, the second lead pattern 942-1 may be formed of a metal material having tensile strength of 1000 MPa or more. For example, the second lead pattern 942-1 may be formed of a binary alloy or a ternary alloy which includes Cu. For example, the second lead pattern 942-1 may be formed of a binary alloy of Cu—Ni. For example, the second lead pattern 942-1 may be formed of a binary alloy of Cu—Sn. For example, the second lead pattern 942-1 may be formed of a binary alloy of Cu-beryllium (Be). For example, the second lead pattern 942-1 may be formed of a binary alloy of Cu-cobalt (Co). For example, the second lead pattern 942-1 may be formed of a ternary alloy of Cu—Ni—Sn. For example, the second lead pattern 942-1 may be formed of a ternary alloy of Cu—Be—Co. In addition to the metal material, the second lead pattern 942-1 may be formed of an alloy of iron (Fe), Ni, and Zn, which has an elastic force to serve as a spring and has a good electrical characteristic. In addition, the second lead pattern 942-1 may be surface-treated with a plating layer including a metal material such as Au, Ag, and palladium (Pd), thereby improving electrical conductivity.

Meanwhile, the second lead pattern 942-1 may be formed through an additive process, a subtractive process, a modified semi-additive process (MSAP), and a semi-additive process (SAP) process, which are typical printed circuit board manufacturing processes.

Meanwhile, the second lead pattern 942-1 may have different line widths for each portion. In order to increase adhesive strength with the insulating layer 941, the first portion 942-11 may have a width that is greater than a width of the other portion. In addition, in order to have elasticity, the second portion 942-12 may have a line width that is smaller than a line width of the first portion 942-11. In this case, the second portion 942-12 may have a line width ranging from 20 µm to 1000 µm. When the line width of the second portion 942-12 is less than 20 µm, the overall rigidity of the second lead pattern 942-1 may be decreased, and thus the reliability of the second lead pattern 942-1 may be degraded. In addition, when the line width of the second portion 942-12 exceeds 1000 µm, the elastic force of the second lead pattern 942-1 is decreased, and thus a problem may occur in shifting of the image sensor module 400.

Meanwhile, the second portion 942-12 may include a buffer pattern for a buffering in region A connected to the first portion 942-11. The buffer pattern may have a shape having a width which is gradually decreased in a direction from the first portion 942-11 toward the second portion 942-12. In this case, the decrease in width has a non-linear characteristic rather than a linear characteristic, and thus an outer surface of the buffer pattern may have a round shape.

The buffer pattern may solve a problem of pattern breakage generated due to a difference in pattern width between the first portion 942-11 and the second portion 942-12 and may stably connect the first portion 942-11 and the third portion 942-13.

In addition, the buffer pattern may not overlap the insulating layer in the vertical direction. Consequently, when the board is moved in the x-axis, the y-axis, and the z-axis and is tilted, since a position at which the connector and the pattern are connected is not present on the insulating layer and is formed outside the insulating layer, the pattern breakage generated due to the difference in width between the connector and the pattern may be effectively reduced.

In addition, the fourth portion 942-14 has a line width that is smaller than a line width of the first portion 942-11. Thus, a buffer pattern having a round outer surface may also be disposed in region B between the fourth portion 942-14 and the first portion 942-11.

Meanwhile, the second portion 942-12 may be bent at least one time according to a predetermined setting. Accordingly, the second portion 942-12 includes a second-first portion 942-12a extending in one direction and a second-second portion 942-12b bent from the second-first portion 942-12a in a direction different from the one direction.

In this case, a side surface of the second-second portion 942-12b may have a round shape other than a straight-line shape. That is, when the side surface of the second-second portion 942-12b has a straight-line shape, stress may be concentrated in the second-second portion 942-12, and thus the breakage of the second lead pattern 942-1 may occur. Therefore, the side surface of the second-second portion 942-12b has a round shape so that stress may be prevented from being concentrated in the second-second portion 942-12b. In this case, a curvature value R of the side surface of the second-second portion 942-12b has a value ranging from 30 and 100. When the curvature value R of the side surface is smaller than 30, a stress concentration prevention effect is insignificant, and when the curvature value R thereof is greater than 100, the elastic force of the second lead pattern 942-1 may be degraded. In this case, the second-second portion 942-12b may include an inner surface and an outer surface according to a bent direction. In addition, a curvature value R of the inner surface of the second-second portion 942-12b is different from a curvature value R of the outer surface of the second-second portion 942-12b so that an effect of stress relaxation may be maximized.

In addition, a line width of the second-second portion 942-12b may be different from a line width of the second-first portion 942-12a. For example, the second-second portion 942-12b may have a line width that is greater than a line width of the second-first portion 942-12a. In this case, stress may be concentrated in the second-second portion 942-12b, and thus the second-second portion 942-12b may be formed to have a line width that is greater than a line width of the second-first portion 942-12a.

Meanwhile, the fifth pad 935 of the third board 930 is located on the fourth portion 942-14. In addition, the fourth portion 942-14 and the fifth pad 935 of the third board 930 may be coupled to each other through soldering.

Meanwhile, in the present embodiment, although it has been described that the corner of the second portion 942-12 of the second lead pattern 942-1 has a quadrangular shape, the present invention is not limited thereto. For example, the second portion 942-12 of the second lead pattern 942-1 may have a circular shape or a polygonal shape and may be bent.

<Image Sensor Module>

FIG. 19 is an exploded perspective view illustrating the image sensor module 400 according to an embodiment, and FIG. 20 is a diagram illustrating the coupling of the third board and the image sensor module 400.

Referring to FIGS. 19 and 20, the image sensor module 400 may include a sensor holder 460, a filter 450, an adhesive member 440, a sensor base 410, the image sensor 430, and an image sensor board 420.

The image sensor module 400 may be coupled to the second board 910 and the board holder 920 through the sensor holder 460. For example, the image sensor module 400 may be fixed to the board holder 920 through the sensor holder 460. Although the image sensor module 400 includes the sensor holder 460, the filter 450, the adhesive member 440, the sensor base 410, the image sensor 430, and the image sensor board 420, at least one component among the above components may be omitted.

The image sensor module 400 may include the sensor holder 460. The sensor holder 460 allows the image sensor module 400 to be stably fixed to the board holder 920. In this case, the sensor holder 460 may include an opening 461, and the opening 461 may be aligned with the filter 450 and the image sensor 430 in the optical axis direction.

The image sensor module 400 includes the sensor base 410.

The sensor base 410 includes an opening 411, and a stepped bump on which the filter 450 may be seated may be provided adjacent to the opening 411. In addition, the adhesive member 440 may be disposed on the stepped bump, and the filter 450 may be fixedly disposed on the adhesive member 440. The filter 450 may serve to block light in a specific frequency band, which passes through the lens module 100, from being incident on the image sensor 430. The filter 450 may be disposed parallel to an x-y plane. The filter 450 may be disposed between the lens module 100 and the image sensor 430. The filter 450 may include an infrared filter. The infrared filter may absorb or reflect infrared rays incident thereon.

The image sensor board 420 may be a package board. That is, the image sensor 430 may be mounted on the image sensor board 420 in the form of a package. The image sensor board 420 may include a printed circuit board (PCB). The image sensor board 420 may include a circuit board. The image sensor 430 may be disposed on the image sensor board 420. The image sensor board 420 may be coupled to the third board 930. To this end, sixth pads 421 electrically connected to the fifth pad 935 of the third board 930 may be provided on a lower surface of the image sensor board 420. In this case, as described above, the sixth pads 421 are also disposed on opposing edges of the lower surface of the image sensor board 420, and thus the position of the pad to which the image signal is transmitted may be separated from the positions of other pads. Meanwhile, the image sensor board 420 may be located in the opening of the third board 930, and the sixth pad 421 may be horizontally aligned with the fifth pad 935 of the third board 930 and be disposed in the opening of the third board 930. In addition, the fifth pad 935 and the sixth pad 421 may be coupled to each other through soldering or the like.

The image sensor 430 may be a component in which light passing through the lens module 100 and the filter 450 is incident to form an image. The image sensor 430 may be mounted on the image sensor board 420. The image sensor 430 may be electrically connected to the image sensor board 420. For example, the image sensor 430 may be coupled to the image sensor board 420 through a surface mounting technology (SMT). As another example, the image sensor 430 may be coupled to the image sensor board 420 through a flip-chip technology. The image sensor 430 may be disposed so that an optical axis thereof is aligned with the lens module 100. That is, an optical axis of the image sensor 430 may be aligned with the optical axis of the lens module 100. The image sensor 430 may convert light incident on an effective pixel region of the image sensor 430 into an electrical signal. In addition, the converted electrical signal may be an image signal. The image sensor 430 may be any one among a CCD, a MOS, a CPD, and a CID.

<Shift Driving Operation of Image Sensor Module>

Hereinafter, a shift operation of the image sensor module 400 will be described. FIG. 21 is a diagram for describing shift driving in an x-axis direction through some components of the camera device according to the present embodiment, FIG. 22 is a diagram for describing shift driving in a y-axis direction through some components of the camera device according to the present embodiment, FIG. 23 is a diagram for describing rotation driving about a z-axis through some configurations of the camera device according to the present embodiment, FIG. 24A is a diagram illustrating the first board and a magnet disposed in a magnet holder together with an x-axis and a y-axis, FIG. 24B is a diagram illustrating the first board, the magnet holder, the magnet, and a coil together with rotation driving in the z-axis, and FIG. 25 is a diagram illustrating a magnetic flow and a Lorentz force between the magnet and the coil of the camera device according to the present embodiment.

As shown in FIG. 21, in the present embodiment, when a current in the same direction is applied to the first coil 916-1 and the third coil 916-3, the image sensor 430 coupled to the image sensor module 400 may be moved (shifted) in the x-axis direction through an electromagnetic interaction with the first magnet 731 and the third magnet 733. That is, the first coil 916-1 and first magnet 731 and the third coil 916-3 and third magnet 733 may be used to shift the image sensor 430 in the x-axis direction. In this case, the first coil 916-1 and the first magnet 731 may be a first x-axis shift driver X1, and the third coil 916-3 and the third magnet 733 may be a second x-axis shift driver X2.

As shown in FIG. 22, in the present embodiment, when a current is applied to the second coil 916-2 and the fourth coil 916-4 in the same direction, the image sensor 430 coupled to the image sensor module 400 may be moved (shifted) in the y-axis direction through an electromagnetic interaction with the second magnet 732 and the fourth magnet 734. That is, the second coil 916-2 and second magnet 732 and the fourth coil 916-4 and fourth magnet 734 may be used to shift the image sensor 430 in the y-axis direction. In this case, the second coil 916-2 and the second magnet 732 may be a first y-axis shift driver Y1, and the fourth coil 916-4 and the fourth magnet 734 may be a second y-axis shift driver Y2.

As shown in FIG. 23, in the present embodiment, when currents are applied to the first coil 916-1 and the third coil 916-3 in opposite directions, when currents are applied to the second coil 916-2 and the fourth coil 916-4 in opposite directions, and, in this case, when the coil 916 is rotated in the same direction due to the current applied to the first coil 916-1 and the current applied to the second coil 916-2, the image sensor 430 coupled to the image sensor module 400 may be rotated (rolled) about the z-axis. The example shown in FIG. 23 illustrates a case in which the coil 916 is controlled through four channels, and when the coil 916 is controlled through three channels, the image sensor 430 may be rolled through the first coil 916-1 and the third coil 916-3 or the second coil 916-2 and the fourth coil 916-4. The reason is that, when there is a coil tied to one channel among the first coil 916-1 and third coil 916-3 and the second coil 916-2 and fourth coil 916-4, a current cannot be applied in the opposite direction.

As shown in FIG. 24B, in the present embodiment, a forward current is applied to the first coil 916-1 so that the first coil 916-1 is pushed in a first direction based on the first magnet 731 (see a of FIG. 24), the forward current is applied to the second coil 916-2 so that the second coil 916-2 is pushed in a second direction based on the second magnet 732 (see b of FIG. 24), a reverse current is applied to the third coil 916-3 so that the third coil 916-3 is pushed in a third direction based on the third magnet 733 (see c of FIG. 24), and a reverse current is applied to the fourth coil 916-4 so that the fourth coil 916-4 is pushed in a fourth direction based on the fourth magnet 734 (see d of FIG. 24), and thus the image sensor 430 coupled to the image sensor module 400 may be rotated about the z-axis (see e of FIG. 24). In this case, the first to fourth directions may correspond to a clockwise direction.

In the present embodiment, a magnetic flow of the magnet 730 is shown in FIG. 25. Referring to FIG. 25, it can be confirmed that a magnetic force line passing perpendicular to the coil 916 is present. In this state, when a current is applied to the coil 916, the coil 916 may move relative to the magnet 730 according to a Lorentz force.

<Driving of Second Actuator>

Hereinafter, in the present embodiment, the driving of the second actuator will be described, and the description of other components of the above-described camera module is equally applied.

FIG. 26 is a conceptual diagram of a second actuator according to an embodiment, FIG. 27 is a block diagram illustrating the second actuator according to an embodiment, FIG. 28 is a diagram for describing the driving of a second actuator according to one example, FIG. 29 is a diagram for describing the driving of a second actuator according to another example, FIG. 30 is a diagram for describing the driving of a second actuator according to still another example, and FIG. 31 is a diagram for describing the driving of a second actuator according to a modified example.

Referring to FIGS. 26 and 27, the second actuator may drive the image sensor 430. The second actuator 600 may tilt or rotate the image sensor 430. The second actuator 600 may move the image sensor 430. The second actuator 600 may move the image sensor 430 in a first direction perpendicular to the optical axis, move the image sensor 430 in a second direction perpendicular to the optical axis and the first direction, and rotate the image sensor 430 about the optical axis. In this case, the first direction may be the x-axis direction, the second direction may be the y-axis direction, and the optical axis may be the z-axis direction. In addition, since the second actuator drives the image sensor in various axes or directions, the second actuator may be a sensor driving device. Accordingly, in the present disclosure, it should be understood that the second actuator may be used interchangeably with the sensor driving device.

In addition, as described above, the sensor driving device may include a fixing part of which a position is fixed, a moving part of which a position is moved due to an electromagnetic force of the driver in a state of being coupled to the fixing part, and an elastic support provided between the fixing part and the moving part.

In addition, as described above, the fixing part corresponds to the fixing board, the moving part corresponds to the moving board, the support includes the wire, and the wire corresponds to a connection wire so that the support may be interchangeably used as the wire part or the connection wire.

The fixing part may include a first sensor 717 which outputs first inclination information and the magnet 730 including a plurality of magnets.

The first sensor 717 may correspond to the above-described gyro sensor. The first sensor 717 may be disposed on a lower surface of a first board in the fixing part and may be accommodated in a first case of the camera device.

In addition, as described above, in order to implement the hand shaking prevention function, the first sensor 717 may be embedded in the fixing part to detect an angular velocity/linear velocity due to hand shaking. In other words, the first sensor 717 may output the first inclination information on the fixing part 700, and the first inclination information may include the angular velocity/linear velocity.

In addition, according to the embodiment, the first sensor 717 may be disposed in a space between the first board and the moving part 900. Accordingly, in the sensor driving device according to the embodiment, space efficiency of components can be improved.

In addition, the magnet including the plurality of magnets may be equally applied as the above description, and the magnet may be driven by reflecting inclination information which will be described below.

The moving part 900 may include the coil 916 including the plurality of coils disposed to face the plurality of magnets and a second sensor 950 for outputting second inclination information.

In addition, as described above, the plurality of coils may be disposed to face the plurality of magnets. In addition, electromagnetic forces between the plurality of magnets and the plurality of coils are generated due to currents applied to the plurality of coils, and the moving part may be moved.

The second sensor 950 may correspond to the above-described gyro sensor. The second sensor 950 may be formed as a gyro sensor in the same manner as the first sensor. In addition, in order to implement the hand shaking prevention function, the second sensor 950 may be embedded in the moving part to detect an angular velocity/linear velocity due to hand shaking. In other words, the second sensor 950 may output the second inclination information on the moving part 900, and the second inclination information may include the angular velocity/linear velocity.

As described above, the image sensor module 400 includes the image sensor 430 and may be coupled to the moving part. Accordingly, when the moving part 900 is moved due to the electromagnetic force between the magnet 730 and the coil 916, the image sensor 430 may also be moved (for example, a rotation or tilting) to correspond to the movement of the moving part 900.

The support includes the wire 800, and the wire 800 is disposed between the fixing part 700 and the moving part 900 so that one end of the support may be connected to the fixing part 700 and the other end thereof may be connected to the moving part 900. In addition, as described above, the wire 800 may be made of an elastic material and may elastically support the moving part 900 which is moved relative to the fixing part 700.

In addition, a controller 610 may receive the first inclination information and the second inclination information from the first sensor 717 and the second sensor 950, respectively, and control an electric signal provided to the coil 916 using the received first and second information. The electric signal is the above-described current, and in order to prevent hand shaking, the controller 610 may adjust a direction or a magnitude of the current according to inclinations of the fixing part 700 and the moving part 900.

In this case, the controller 610 may correspond to the above-described driver IC, but the present invention is not limited thereto, and the controller 610 may be located inside the fixing part 700 or the moving part 900.

Referring to FIG. 28, the controller may control the electrical signal by comparing the first inclination information with the second inclination information.

Specifically, since the fixing part and the moving part are connected through a wire made of an elastic material, the fixing part and the moving part may be equally or differently moved in the camera module with respect to the same external force (for example, hand shaking). Accordingly, the first inclination information and the second inclination information may be the same or different from each other with respect to a time.

In this case, when the first inclination information matches the second inclination information, the controller may control the electrical signal according to the first inclination information or the second inclination information.

Hereinafter, in drawings, TI1 is the first inclination information (an inclination of the fixing part with respect to a time) received from the first sensor, and TI2 is the second inclination information (an inclination of the moving part with respect to a time) received from the second sensor. In addition, TI1 and TI2 are inclination information in one direction, and it will be described that detection time points through the gyro sensor are synchronized. In addition, the description will be made on the basis that hand shaking has a period T.

Referring to the drawing, the inclination of the fixing part is equal to the inclination of the moving part until a first point T1. In addition, the inclination of the fixing part is equal to the inclination of the moving part between a second point T2 and a third point T3. In addition, the inclination of the fixing part is equal to the inclination of the moving part between a fourth point T4 and the period T.

In this case, the fixing part according to the embodiment may control the electric signal according to the first inclination information or the second inclination information in a section to the first point T1, a section between the second point T2 and the third point T3, and a section between the fourth point T4 and the period T, where the first inclination information (the inclination of the fixing part) matches the second inclination information (the inclination of the moving part). That is, the controller may perform the hand shaking prevention function by reflecting the inclination of the fixing part or the inclination of the moving part.

Alternatively, when the first inclination information is different from the second inclination information, the controller according to the embodiment may control the electrical signal according to the second inclination information.

That is, the controller may control the electrical signal according to the second inclination information in a section between the first point T1 and the second point T2 and a section between the third point T3 and the fourth point T4, in which the first inclination information (the inclination of the fixing part) is different from the second inclination information (the inclination of the moving part).

For example, corresponding to the first inclination information, the controller may provide an electrical signal to the coil until the first point T1 to perform a hand shaking prevention function. In addition, corresponding to the second inclination information, the controller may provide an electrical signal to the coil from the first point T1 to the second point T2 to perform the hand shaking prevention function. In this case, since the inclination of the moving part is greater than the inclination of the fixing part, an intensity of the current compared to the first inclination information may be increased.

In addition, corresponding to the first inclination information, the controller may provide an electrical signal to the coil from the second point T2 to the third point T3 to perform the hand shaking prevention function. In addition, corresponding to the second inclination information, the controller may provide an electrical signal to the coil from the third point T3 to the fourth point T4 to perform the hand shaking prevention function. Similarly, since the inclination of the moving part is greater than the inclination of the fixing part from the third point T3 to the fourth point T4, the intensity of the current compared to the first inclination information may be increased.

In addition, corresponding to the first inclination information, the controller may provide an electrical signal to the coil from the fourth point T4 to the period T to perform the hand shaking prevention function.

With the above configuration, due to the wire having elasticity, even when the inclination of the moving part and the inclination of fixing part with respect to hand shaking are different, the sensor driving device may apply the inclination the moving part, which is coupled to the image sensor to be moved, to provide an accurate hand shaking prevention function.

In addition, the controller may control the electrical signal using the first inclination information and then readjust the electrical signal corresponding to the second inclination information.

In other words, the controller performs the hand shaking prevention function by reflecting the inclination of the fixing part, and then when the inclination of the fixing part and the inclination of the moving part have a predetermined ratio with respect to a magnitude of the inclination of the fixing part, the controller may readjust the electrical signal to perform the hand shaking prevention function by reflecting the inclination of the moving part. In this case, in order to determine whether the inclination of the moving part and the first inclination information have the above-described ratio, the inclination of the moving part and the first inclination information may have a time difference.

For example, at the same time point, when a ratio of a difference b between the inclination of the moving part and the inclination of the fixed part with respect to an inclination a of the fixing part from the first inclination information is greater than 10%, the hand shaking prevention function may be performed by reflecting the inclination of the moving part at a time point having a time difference with the same time point Tk. Accordingly, even when the moving part has additional shaking in addition to hand shaking due to the wire having elasticity, the sensor driving device according to the embodiment may remove the additional shaking to correct shaking due to an external force applied to the camera device. Therefore, the controller may remove minute shaking to improve a processing speed. In addition, the hand shaking prevention function is performed by reflecting the inclination of the moving part through the above-described ratio so that defocusing which is generated as shaking increases may be easily removed.

Referring to FIG. 29, as described above, hereinafter, TI1 is the first inclination information (an inclination of the fixing part with respect to a time) received from the first sensor, and TI2 is the second inclination information (an inclination of the moving part with respect to a time) received from the second sensor. In addition, TI1 and TI2 are inclination information in one direction, and it will be described that detection time points through the gyro sensor are synchronized. In addition, the description will be made on the basis that hand shaking has a period T.

The controller may control the electrical signal using an average inclination of the first inclination information and the second inclination information. That is, the controller may control the electric signal to perform the hand shaking prevention function by reflecting both the inclination of the fixing part and the inclination of the moving part. For example, the inclination of the fixing part has a first maximum value d in the period T, and the inclination of the moving part has a second maximum value c in the period T. In this case, at a fifth point T5, the first maximum value d and the second maximum value c are the inclination of the fixing part and the inclination of the moving part, respectively.

In addition, the controller may determine that an average inclination of the first maximum value d and the second maximum value c at the fifth point T5 is the shaking of the sensor driving device (or the camera device), thereby performing the hand shaking prevention function.

With the above configuration, the sensor driving device may compensate for a difference k between the inclination of the fixing part and the inclination of the moving part, thereby providing a more accurate hand shaking prevention function. In addition, the sensor driving device may remove an inclination error due to the wire having elasticity in a calculation process, thereby improving a processing speed.

Referring to FIG. 30, as described above, hereinafter, TI1 is a first inclination information (an inclination of the fixing part with respect to a time) received from the first sensor. In addition, TI1 is inclination information in one direction, and it will be described that detection time points through gyro sensors are synchronized. In addition, the description will be made on the basis that hand shaking has a period T.

Corresponding to the second inclination information for a predetermined time, the controller may perform the hand shaking prevention function on the basis of a magnitude inflection point of the first inclination information.

Referring to the drawing, the inclination of the fixing part is changed from positive to negative based on a half period T0 which is half of the period T. That is, the half period T0 and the period T may be magnitude inflection points of inclination information in which the inclination is changed from positive to negative or from negative to positive.

In this case, at the magnitude inflection points T0 and T, the controller may control the electric signal to perform the hand shaking prevention function using the inclination of the moving part for a predetermined time td. Accordingly, even when the shaking of the moving part is maximally generated by the wire at the magnitude inflection points, the controller may compensate for the maximum shaking to perform a more accurate hand shaking prevention function.

Referring to FIG. 31, as described above, since the fixing part and the moving part are connected through a wire made of an elastic material, the fixing part and the moving part may be equally or differently moved in the camera module with respect to the same external force (for example, hand shaking). Accordingly, the first inclination information and the second inclination information may be the same or different from each other with respect to a time.

In addition, as described above, in drawings, TI1-1 is first inclination information (an inclination of the fixing part with respect to a time) received from the first sensor in a first direction, and TI1-2 is first inclination information (an inclination of the moving part with respect to a time) received from the first sensor in a second direction. TI2-1 is second inclination information (an inclination of the moving part with respect to a time) received from the second sensor in the first direction, and TI2-2 is second inclination information (the inclination of the moving part with respect to the time) received from the second sensor in the second direction. In addition, TI1-1, TI1-2, TI2-1, and TI2-2 will be described as being synchronized with detection time points through the gyro sensor. In addition, the description will be made on the basis that hand shaking has a period T.

According to the embodiment, the controller may compensate for differences in magnitudes of the first inclination information and the second inclination information for each direction, thereby controlling the electrical signal.

First, the fixing part may control the electric signal according to the first inclination information or the second inclination information in a section to the first point T1, a section between the second point T2 and the third point T3, and a section between the fourth point T4 and the period T, where the first inclination information (the inclination of the fixing part) matches the second inclination information (the inclination of the moving part). That is, the controller may perform the hand shaking prevention function by reflecting the inclination of the fixing part or the inclination of the moving part.

First, in the first direction, the controller may control the electrical signal according to the second inclination information in a section between the first point T1 and the second point T2 and a section between the third point T3 and the fourth point T4, in which the first inclination information (the inclination of the fixing part) is different from the second inclination information (the inclination of the moving part).

That is, in response to the first inclination information, the controller may provide an electrical signal to the coil until the first point T1 to perform a hand shaking prevention function. In addition, corresponding to the second inclination information, the controller may provide an electrical signal to the coil from the first point T1 to the second point T2 to perform the hand shaking prevention function. In this case, since the inclination of the moving part is greater than the inclination of the fixing part, an intensity of the current compared to the first inclination information may be increased.

In addition, corresponding to the first inclination information, the controller may provide an electrical signal to the coil from the second point T2 to the third point T3 to perform the hand shaking prevention function. In addition, corresponding to the second inclination information, the controller may provide an electrical signal to the coil from the third point T3 to the fourth point T4 to perform the hand shaking prevention function. Similarly, since the inclination of the moving part is greater than the inclination of the fixing part from the third point T3 to the fourth point T4, the intensity of the current compared to the first inclination information may be increased.

In addition, corresponding to the first inclination information, the controller may provide an electrical signal to the coil from the fourth point T4 to the period T to perform the hand shaking prevention function.

With the above configuration, due to the wire having elasticity, even when the inclination of the moving part and the inclination of fixing part with respect to hand shaking are different, the sensor driving device may apply the inclination the moving part, which is coupled to the image sensor to be moved, to provide an accurate hand shaking prevention function.

In addition, the controller may differently control the electrical signal according to the first inclination information and the second inclination information in the second direction which is a different direction. The controller may control the electrical signal according to the second inclination information (that is, TI2-2) in all sections, in which the first inclination information (the inclination of the fixing part) is different from the second inclination information (the inclination of the moving part) in the second direction.

Additionally, the controller may control the electrical signal according to the second inclination information in an overlapping section OVP in which both the first inclination information and the second inclination information are different in the first direction and the second direction. For example, the controller may control the electrical signal to perform the hand shaking prevention function according to the second inclination information TI2-1 and TI2-2 between a first point T1 and a second point T2 and between a third point T3 and a fourth point T4.

That is, the sensor driving device reflects the inclination of the fixing part to perform the hand shaking prevention function, and then when the inclination of the fixing part and the inclination of the moving part are different at all the axes where the inclinations are detected, the sensor driving device may reflect the inclination of the moving part. Therefore, since correction is performed only in a section in which the moving part has large shaking due to the wire having elasticity, defocusing is easily removed and minute shaking is removed so that a processing speed can be improved.

<Optical Instrument>

FIG. 32 is a perspective view illustrating an optical instrument according to the present embodiment, and FIG. 33 is a block diagram illustrating the optical instrument shown in FIG. 32.

The optical instrument may be any one among a mobile phone, a portable phone, a smart phone, a portable smart device, a digital camera, a laptop computer, a digital broadcasting terminal, a personal digital assistant (PDA), a portable multimedia player (PMP), and a navigation device. However, the types of optical instrument are not limited thereto, and any device for capturing videos or images may be included in the optical instrument.

The optical instrument may include a body 1250. The body 1250 may be in the form of a bar. Alternatively, the body 1250 may have any type such as a slide type, a folder type, a swing type, or a swirl type, in which two or more sub-bodies are coupled to be movable relative to each other. The body 1250 may include a case (a casing, a housing, and a cover) forming an exterior. For example, the body 1250 may include a front case 1251 and a rear case 1252. Various electronic components of the optical instrument may be embedded in a space formed between the front case 1251 and the rear case 1252. A display 1151 may be disposed on one surface of the body 1250. A camera 1121 may be disposed on one or more surfaces of one surface of the body 1250 and the other surface disposed opposite to the one surface.

The optical instrument may include a wireless communication part 1110. The wireless communication part 1110 may include one or more modules which allow wireless communication between the optical instrument and a wireless communication system or between the optical instrument and a network to which the optical instrument is connected. For example, the wireless communication part 1110 may include one or more among a broadcast receiving module 1111, a mobile communication module 1112, a wireless Internet module 1113, a short-range communication module 1114, and a location information module 1115.

The optical instrument may include an audio/video (A/V) input part 1120. The A/V input part 1120 is for receiving an input of an audio signal or a video signal, and may include one or more of a camera 1121 and a microphone 1122. In this case, the camera 1121 may include the camera device according to the present embodiment.

The optical instrument may include a sensing part 1140. The sensing part 1140 may detect a current state of the optical instrument, which includes an opening/closing state of the optical instrument, a position of the optical instrument, the presence or absence of a user contact, an orientation of the optical instrument, and acceleration/deceleration of the optical instrument, and generate a sensing signal for controlling an operation of the optical instrument.

For example, when the optical instrument is in the form of a slide phone, the sensing part 1140 may detect whether the slide phone is opened or closed. In addition, the sensing part 1140 may be in charge of a sensing function related to whether a power supply 1190 supplies power and whether an interface 1170 is coupled to an external device.

The optical instrument may include an input/output part 1150. The input/output part 1150 may be a component for generating an input or an output related to a visual sense, an auditory sense, or a tactile sense. The input/output part 1150 may generate input data for controlling the operation of the optical instrument and may output information processed by the optical instrument.

The input/output part 1150 may include one or more among a keypad 1130, a display 1151, a sound output module 1152, and a touch screen panel 1153. The keypad 1130 may generate input data by a keypad input. The display 1151 may output an image captured by the camera 1121. The display 1151 may include a plurality of pixels of which colors are changed in response to an electrical signal. For example, the display 1151 may include at least one among a liquid crystal display, a thin film transistor-liquid crystal display, an organic light-emitting diode, a flexible display, or a three-dimensional (3D) display. The sound output module 1152 may output audio data received from the wireless communication part 1110 in a call signal reception mode, a call mode, a recording mode, a voice recognition mode, or a broadcast reception mode or output audio data stored in a memory 1160. The touch screen panel 1153 may convert a variation in capacitance generated due to a touch of a user in a specific region of a touch screen into an electrical input signal.

The optical instrument may include the memory 1160. A program for processing and controlling of a controller 1180 may be stored in the memory 1160. In addition, the memory 1160 may store input/output data, for example, one or more among a telephone directory, a message, an audio, a still image, a photograph, and a video. The memory 1160 may store an image captured by the camera 1121, for example, a photograph or a video.

The optical instrument may include the interface 1170. The interface 1170 serves as a path for connection to an external device connected to the optical instrument. The interface 1170 may receive data from an external device, receive power and transmit the power to each component in the optical instrument, or transmit data in the optical instrument to an external device. The interface 1170 may include one or more among a wired/wireless headset port, an external charger port, a wired/wireless data port, a memory card port, a port for connecting a device equipped with an identification module, an audio input/output (I/O) port, a video I/O port, and an earphone port.

The optical instrument may include the controller 1180. The controller 1180 may control the overall operation of the optical instrument. The controller 1180 may perform control and processing related to a voice call, data communication, and a video call. The controller 1180 may include a multimedia module 1181 for multimedia playback. The multimedia module 1181 may be provided in the controller 1180 or may be provided separately from the controller 1180. The controller 1180 may perform pattern recognition processing capable of recognizing a handwriting input and an image drawing input, which are performed on the touch screen, as a character and an image, respectively.

The optical instrument may include the power supply 1190. Under the control of the controller 1180, the power supply 1190 may receive external power or internal power to supply power required for an operation of each component.

According to the embodiment, in order to implement the OIS function and the AF function of the camera module, the image sensor is moved relative to the lens barrel in the x-axis, y-axis, and z-axis directions instead of moving the lens barrel according to the related art. Accordingly, the camera module according to the embodiment may remove a complicated spring structure for implementing the OIS function and the AF function, and thus the structure may be simplified. In addition, since the image sensor according to the embodiment is moved relative to the lens barrel, it is possible to form a stable structure compared with the conventional structure.

In addition, according to the embodiment, the terminal electrically connected to the image sensor has a spring structure and is floated and disposed at a position not overlapping the insulating layer in the vertical direction. Accordingly, the camera module can stably elastically support the image sensor and move the image sensor with respect to the lens barrel.

According to the above embodiments, the x-axis direction shift, the y-axis direction shift, and a z-axis rotation corresponding to hand shaking may be performed on the image sensor. Accordingly, hand shaking correction on the image sensor and hand shaking correction on a corresponding lens may be performed together and, consequently, a more improved hand shaking correction function can be provided.

In addition, according to the embodiments, electrical elements required for the camera circuit are embedded using an inner space of the second actuator which moves the image sensor relative to the lens barrel so that the overall height of the camera device can be reduced.

In addition, according to the embodiments, parts of the camera circuit and parts of the second actuator are integrated and fused so that a camera assembly process can be simplified.

While the embodiments of the present invention have been described with reference to the accompanying drawings those skilled in the art can understand that the present invention can be implemented in other specific forms without departing from the technical spirit or the necessary features of the present invention. Therefore, it should be understood that the above-described embodiments are not restrictive but illustrative in all aspects.

What is claimed is:
1. A sensor driving device comprising:
   a fixing part including a first sensor configured to output first inclination information and a plurality of magnets;
   a moving part which includes a plurality of coils disposed to face the plurality of magnets and a second sensor configured to output second inclination information and which is disposed to be spaced apart from the fixing part;
   an image sensor coupled to the moving part;
   a support connecting the fixing part and the moving part and is made of an elastic material; and
   a controller configured to control electrical signals provided to the plurality of coils using the first inclination information and the second inclination information.

2. The sensor driving device of claim 1, wherein the support electrically connects the moving part and the fixing part.

3. The sensor driving device of claim 1, wherein the support is disposed between the moving part and the fixing part.

4. The sensor driving device of claim 1, wherein a length of the support is greater than a sum of the thicknesses of the fixing part and the moving part.

5. The sensor driving device of claim 1, wherein the support is made of metal and elastically supports the movement of the moving part.

6. The sensor driving device of claim 1, wherein, the plurality of coils includes a first coil, a second coil, and a third coil that are spaced apart from each other.

7. The sensor driving device of claim 6, wherein the first coil and the third coil are arranged long in a first direction, the second coil is disposed long in a second direction, and the first direction and the second direction are perpendicular.

8. The sensor driving device of claim 6, wherein a long side of the first coil and a long side of the second coil are arranged not to be parallel to each other.

9. The sensor driving device of claim 6, wherein a long side of the first coil and a long side of the second coil are arranged so that virtual extension lines are perpendicular to each other.

10. The sensor driving device of claim 6, wherein an arrangement direction of the first coil and the arrangement direction of the second coil are orthogonal.

11. The sensor driving device of claim 6, wherein current is independently applied to the first coil to third coil.

12. The sensor driving device of claim 1, wherein the image sensor is disposed inside the moving part and is moved according to a movement of the moving part.

13. The sensor driving device of claim 1, wherein each of the first inclination information and the second inclination information includes an angular velocity or a linear velocity.

14. The sensor driving device of claim 1, wherein the controller compensates for a difference in magnitude of the first inclination information and the second inclination information in each direction and controls the electrical signal.

15. The sensor driving device of claim 1, wherein the plurality of coils are moved based on the plurality of magnets due to the electric signal.

16. The sensor driving device of claim 1, when the moving part is moved due to the electromagnetic force between the magnet and the coil, and the image sensor also is moved to correspond to the movement of the moving part.

17. The sensor driving device of claim 1, wherein the controller adjusts the direction or magnitude of the current according to the inclination of the fixing part and the moving part.

18. The sensor driving device of claim 1, wherein the controller controls the electrical signal with the second inclination information for a predetermined time at the inflection points.

19. The sensor driving device of claim 1, wherein the first inclination information and the second inclination information are the same or different with respect to an external force.

20. The sensor driving device of claim 1, wherein, when the first inclination information in the first direction and the second inclination information in the first direction are different from each other, the controller controls the electric signal in response to the second inclination information.

* * * * *